(12) United States Patent
Mendonsa et al.

(10) Patent No.: US 11,361,787 B1
(45) Date of Patent: Jun. 14, 2022

(54) ZERO SKEW DISK DRIVE WITH DUAL ACTUATORS

(71) Applicant: Seagate Technology LLC, Fremont, CA (US)

(72) Inventors: Riyan Alex Mendonsa, Edina, MN (US); Brett R. Herdendorf, Mound, MN (US); Gordon A. Harwood, Minneapolis, MN (US); Krishnan Subramanian, Shakopee, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/389,950

(22) Filed: Jul. 30, 2021

(51) Int. Cl.
*G11B 5/48* (2006.01)
*G11B 5/55* (2006.01)

(52) U.S. Cl.
CPC .......... *G11B 5/4813* (2013.01); *G11B 5/4833* (2013.01); *G11B 5/4886* (2013.01); *G11B 5/55* (2013.01); *G11B 5/5539* (2013.01)

(58) Field of Classification Search
CPC .... G11B 5/4813; G11B 5/4833; G11B 5/4886
See application file for complete search history.

(56) References Cited

U.S. PATENT DOCUMENTS

| | | | |
|---|---|---|---|
| 4,034,613 A | 7/1977 | Halfhill et al. | |
| 4,189,759 A * | 2/1980 | Bauck | G11B 21/16 |
| 4,287,445 A | 9/1981 | Lienau | |
| 4,322,840 A | 3/1982 | Kusaka | |
| 4,376,294 A * | 3/1983 | Meier | G11B 5/54 |
| | | | 360/255.9 |
| 4,392,165 A | 7/1983 | Wright | |
| 4,545,046 A | 10/1985 | Jansen et al. | |

(Continued)

FOREIGN PATENT DOCUMENTS

FR        2749696 A1    12/1997

OTHER PUBLICATIONS

He, Zhimin et al., "Mechanisms of Minimum Skew Angle Actuation for Hard Disk Drives", A*Star, Data Storage Institute, 2 Fusionopolis Way, #08-01, Innovis, Singapore 138634, MATEC Web of Conferences 42, 02002 (2016), DOI: 10.1051/matecconf/20164202002, ©Owned by the authors, published by EDP Sciences, 2016, 5 pages.

(Continued)

*Primary Examiner* — Brian E Miller
(74) *Attorney, Agent, or Firm* — Westman, Champlin & Koehler, P.A.

(57) ABSTRACT

A data storage device includes a stack of a plurality of disks, first and second arms, first and second heads, first and second linear drivers and an elevator. Each of the plurality of disks includes a read/write surface. The first arm has a first head end that is movable relative to the stack. The first head is configured to interact with a selected one of the read/write surfaces. The first linear driver is configured to move the first arm along a first straight line in a x-y plane defined by the one of the read/write surfaces. The elevator is configured to move the first arm in a z direction. The second arm has a second head end that is movable relative to the stack and supports the second head. The second linear driver is configured to move the second arm along a second straight line in the x-y plane.

20 Claims, 24 Drawing Sheets

(56) References Cited

U.S. PATENT DOCUMENTS

| | | | |
|---|---|---|---|
| 4,613,962 A | 9/1986 | Inoue et al. | |
| 4,631,611 A | 12/1986 | Schneider | |
| 4,663,682 A * | 5/1987 | McNeil | G11B 5/6005 360/244.9 |
| 4,672,490 A * | 6/1987 | Shigenai | G11B 5/54 360/246.3 |
| 4,703,375 A * | 10/1987 | Chan | G11B 5/54 360/246.1 |
| 4,742,410 A * | 5/1988 | Smith | G11B 5/54 360/255.3 |
| 4,745,503 A | 5/1988 | Muraoka et al. | |
| 4,763,314 A | 8/1988 | McCaslin et al. | |
| 4,764,829 A | 8/1988 | Makino | |
| 4,792,707 A | 12/1988 | Katanuma | |
| 4,800,818 A | 1/1989 | Kawaguchi et al. | |
| 4,819,108 A * | 4/1989 | Seki | G11B 5/54 360/267.4 |
| 4,888,751 A | 12/1989 | Yoshimaru et al. | |
| 4,902,971 A * | 2/1990 | Guzik | G11B 5/012 324/212 |
| 4,937,692 A | 6/1990 | Okutsu | |
| 4,974,104 A | 11/1990 | Ferguson et al. | |
| 5,007,712 A | 4/1991 | Kikuchi et al. | |
| 5,016,238 A | 5/1991 | Shtipelman et al. | |
| 5,029,030 A | 7/1991 | Luecke | |
| 5,043,964 A | 8/1991 | Suzuki | |
| 5,229,901 A | 7/1993 | Mallary | |
| 5,317,552 A | 5/1994 | Yamasaki | |
| 5,396,385 A * | 3/1995 | Tangi | G11B 5/54 360/246.1 |
| 5,467,238 A * | 11/1995 | Lee | G11B 5/41 360/128 |
| 5,493,463 A | 2/1996 | Hagen | |
| 5,521,778 A | 5/1996 | Boutaghou et al. | |
| 5,801,531 A | 9/1998 | Viches et al. | |
| 5,825,180 A | 10/1998 | Guzik | |
| 5,875,166 A | 2/1999 | Ikegame et al. | |
| 5,968,627 A * | 10/1999 | Nigam | C23C 14/16 428/846.6 |
| 6,043,957 A | 3/2000 | Hattori et al. | |
| 6,064,550 A | 5/2000 | Koganezawa | |
| 6,157,521 A | 12/2000 | Utsunomiya | |
| 6,310,750 B1 | 10/2001 | Hawwa et al. | |
| 6,344,950 B1 | 2/2002 | Watson et al. | |
| 6,356,640 B1 | 3/2002 | Lin | |
| 6,362,933 B1 | 3/2002 | Sampietro et al. | |
| 6,369,988 B1 | 4/2002 | Yoshida et al. | |
| 6,480,361 B1 | 11/2002 | Patterson | |
| 6,549,377 B2 | 4/2003 | Yoshida et al. | |
| 6,765,744 B2 | 7/2004 | Gomez et al. | |
| 6,987,637 B2 | 1/2006 | Litvinov et al. | |
| 7,027,147 B2 | 4/2006 | Steenhoek et al. | |
| 7,072,147 B2 | 7/2006 | Limmer et al. | |
| 7,199,981 B2 | 4/2007 | Zabtcioglu | |
| 7,372,671 B2 | 5/2008 | Yazawa | |
| 7,375,930 B2 | 5/2008 | Yang et al. | |
| 7,492,542 B2 | 2/2009 | van Zyl | |
| 7,652,847 B2 | 1/2010 | Weiss et al. | |
| 7,672,083 B1 | 3/2010 | Yu et al. | |
| 7,710,683 B2 | 5/2010 | Craig et al. | |
| 8,958,172 B1 | 2/2015 | Hansen | |
| 8,958,173 B1 | 2/2015 | Hirano et al. | |
| 9,218,833 B1 | 12/2015 | Shah et al. | |
| 9,361,919 B1 | 6/2016 | Lieu et al. | |
| 10,192,575 B1 | 1/2019 | Resh | |
| 10,249,339 B1 | 4/2019 | Mendonsa et al. | |
| 10,269,380 B1 | 4/2019 | Sun et al. | |
| 10,431,246 B2 | 10/2019 | Zhu et al. | |
| 10,510,373 B1 * | 12/2019 | Granz | G11B 20/1258 |
| 10,622,012 B1 | 4/2020 | Tu et al. | |
| 10,699,730 B1 * | 6/2020 | Uefune | G11B 5/012 |
| 10,706,879 B2 | 7/2020 | Garbarino | |
| 10,803,891 B1 | 10/2020 | Jacoby et al. | |
| 10,818,317 B1 | 10/2020 | Erden et al. | |
| 10,978,100 B1 * | 4/2021 | Myers | G11B 5/4826 |
| 11,037,590 B2 * | 6/2021 | Nguyen | G11B 5/582 |
| 11,062,734 B1 * | 7/2021 | Brand | G11B 5/4813 |
| 11,120,834 B1 * | 9/2021 | Herdendorf | G11B 5/54 |
| 2004/0008609 A1 | 1/2004 | Fujibayashi et al. | |
| 2004/0087253 A1 * | 5/2004 | Mahadev | G11B 5/102 451/41 |
| 2004/0130320 A1 | 7/2004 | Guzik et al. | |
| 2004/0179465 A1 | 9/2004 | Kuwajima et al. | |
| 2004/0257710 A1 * | 12/2004 | Limmer | G11B 5/5521 360/264.3 |
| 2005/0225875 A1 | 10/2005 | Wada et al. | |
| 2005/0280945 A1 | 12/2005 | Duvall et al. | |
| 2007/0279804 A1 * | 12/2007 | White | G11B 5/6005 360/234.3 |
| 2008/0084636 A1 | 4/2008 | Oh et al. | |
| 2010/0246068 A1 | 9/2010 | Lee | |
| 2011/0038074 A1 | 2/2011 | Viskochil et al. | |
| 2012/0206830 A1 | 8/2012 | Gao et al. | |
| 2016/0171993 A1 * | 6/2016 | Okubo | G11B 5/3179 360/61 |
| 2018/0301162 A1 * | 10/2018 | Erden | G11B 5/4886 |
| 2020/0027480 A1 | 1/2020 | Myers et al. | |
| 2020/0202891 A1 | 6/2020 | Mendonsa et al. | |
| 2020/0227077 A1 | 7/2020 | Sukla et al. | |
| 2021/0312945 A1 * | 10/2021 | Mendonsa | G11B 5/012 |

OTHER PUBLICATIONS

Cordle, Michael, "Effects of Skew Angle and Transition Curvature in HAMR Hard Disk Drives", A Thesis Submitted to the Faculty of the University of Minnesota, May 2017, 63 pages.

U.S. Appl. No. 17/196,192, filed Mar. 9, 2021, "Rotating Ramp With Retraction Capability for a Disk Drive", 33 pages.

U.S. Appl. No. 17/016,326, filed Sep. 9, 2020, "Brake Crawler for Elevator-Type Hard Disk Drives", 30 pages.

U.S. Appl. No. 17/223,447, filed Apr. 6, 2021, "Data Storage Device Linear Actuator", 36 pages.

U.S. Appl. No. 16/863,287, filed Apr. 30, 2020, "Split Ramp for Data Storage Devices", issuing as U.S. Pat. No. 11,094,347 on Aug. 17, 2021, 22 pages.

U.S. Appl. No. 17/163,983, filed Feb. 1, 2021, "Ramp Activation Systems Foran Elevator Drive", 34 pages.

U.S. Appl. No. 17/172,684, filed Feb. 10, 2021, "Adjusting HGA Z-Height via HSA Elevator Using Head/Actuator Feedback", 24 pages.

U.S. Appl. No. 17/233,818, filed Apr. 19, 2021, "Zero Skew Elevator System", 51 pages.

Non-Final Rejection for U.S. Appl. No. 17/233,818, Notification Date: Oct. 22, 2021, 8 pages.

\* cited by examiner

ZERO SKEW DISK DRIVE WITH DUAL ACTUATORS

SUMMARY

In one embodiment, a data storage device comprises a stack of a plurality of data storage disks, first and second arms, first and second heads, first and second linear drivers and an elevator. Each of the plurality of data storage disks comprises a read/write surface. The first arm has a first head end that is movable relative to the stack. The first head is supported by the first head end of the first arm, and the first head is configured to interact with a selected one of the read/write surfaces. The first linear driver is configured to move the first arm along a first straight line in a x-y plane defined by the one of the read/write surfaces. The elevator is configured to move the first arm in a z direction. The second arm has a second head end that is movable relative to the stack. The second head is supported by the second head end of the second arm. The second linear driver is configured to move the second arm along a second straight line in the x-y plane.

In another embodiment, a data storage device comprises a data storage disk, first and second arms, first and second heads, first and second ramps, and first and second linear drivers. The data storage disk has a read/write surface defining an x-y plane. The first arm has a first head end that is movable relative to the data storage disk. The first head is supported by the first head end of the first arm, and the first head is configured to interact with the read/write surface. The first ramp is configured to support the first head proximate an outer diameter of the data storage disk. The first linear driver is configured to move the first arm along a first straight line in the x-y plane between the first ramp and an inner diameter of the data storage disk. The second arm has a second head end that is movable relative to the data storage disk. The second head is supported by the second head end of the second arm, and the second head is configured to interact with the read/write surface. The second ramp is configured to support the second head proximate the outer diameter of the data storage disk. The second linear driver is configured to move the second arm along a second straight line in the x-y plane between the second ramp and the inner diameter of the data storage disk, the second straight line being parallel to the first straight line.

In yet another embodiment, a method comprise supporting a first head with a first arm, wherein the first head is configured to interact with a first read/write surface of a data storage disk defining an x-y plane; moving the first arm relative to the data storage disk along a first straight line in the x-y plane; moving the first arm in a z direction; supporting a second head with a second arm; moving the second arm relative to the data storage disk along a second straight line in the x-y plane, the second straight line being parallel to the first straight line; and moving the second arm in the z direction.

Other features and benefits that characterize embodiments of the disclosure will be apparent upon reading the following detailed description and review of the associated drawings.

DETAILED DESCRIPTION OF ILLUSTRATIVE EMBODIMENTS

Figure 1A:
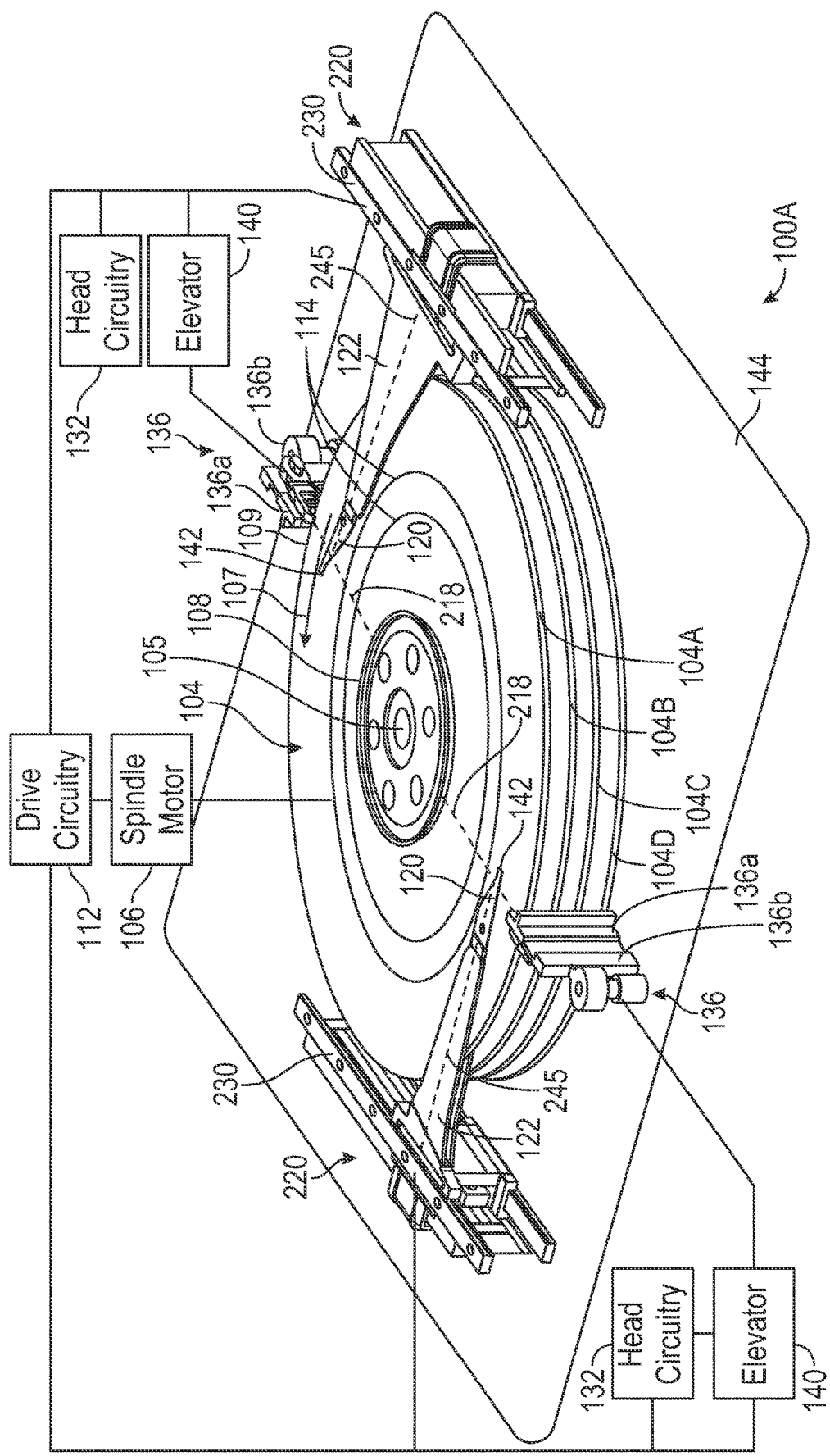
FIG. 1A is a schematic illustration of a first exemplary embodiment of a data storage device.

The present disclosure generally relates to data storage devices that utilize magnetic storage media, such as hard disks. The storage capacity of hard disk drives (HDDs) has steadily increased due to an increase in areal density provided by such technological advances as perpendicular recording, shingled magnetic recording (SMR), heat-assisted magnetic recording (HAMR), interleaved magnetic recording (IMR), microwave-assisted magnetic recording (MAMR), and helium filling, for example.

One way to address the need for greater HDD performance is to utilize multiple read/write heads in parallel. Such parallelism can increase the rate of input/output operations (IOPS) and thereby speed up certain operations. Use of simultaneously operating read/write heads can provide other options; for example, a HDD can be configured with zones having different levels of throughput and capacity, and multiple heads can be operated in different modes to improve throughput in some zones while improving capacity (or other performance parameter) in others. In some aspects, the two actuator arms are independently operable so that they can interact at different locations on a disk stack and/or with different disk surfaces.

In embodiments described below, a hard disk drive includes multiple heads, driven by separate linear actuators, that can read from and/or write to one or more disks simultaneously. The illustrated embodiments show two actuator arm assemblies operable with a single disk stack, each of the actuator arm assemblies supporting one or more heads. However, it is contemplated that more than two actuator arm assemblies may be used with a disk stack. Simultaneous active heads can be used to increase data rate or for other purposes (such as to increase reliability or service different requests in parallel, for example). In order to allow multiple heads to simultaneously write to and read from the same disk surface, the signal processing circuitry of the drive may include parallel processing paths. For example, the processing circuitry may include multiple read/write channels for processing (e.g., decoding and/or encoding) user and control data. The processing circuitry may also include multiple servo control logic sections that allow data from each reader to be used for servo control of the head or heads in which the readers are embedded. This servo logic also provides timing signals used by the signal processing logic.

In general, in order to keep read/write heads from landing on one or more disks in a hard disk drive when, for example, power is removed from the HDD, and to prevent the heads from colliding with outer edges of the disks during load and unload operations, a head-support ramp is provided adjacent to an outer diameter (OD) of the disk or disks. In current HDDs, a number of heads is equal to a number of disk surfaces, and the heads are rotated for positioning over their corresponding disk surfaces. There is typically no up/down movement of the heads in such HDDs. However, in an "elevator" drive, for example, the number of heads employed is less than the number of disk surfaces, and a head stack assembly (HSA) including the fewer number of heads is moved up and down to enable a single head to read from multiple disk surfaces. While particular descriptions of elevators are included, it is to be understood that other elevator configurations can also be used, such as those described in the following commonly owned patent application and patent, which are hereby incorporated by reference: U.S. application Ser. No. 17/233,818 filed on Apr. 19, 2021, entitled "Zero Skew Elevator System;" and U.S. Pat. No. 10,269,380 for "Disk drive having multiple disks accessible by a reduced number of read/write heads." The up/down movement is possible when the HSA is rotated or otherwise moved such that the heads are away from the disks and are supported on a ramp. Conventional ramps are a single unit with an edge of the ramp over the OD of the disks. This ramp design prevents up/down movement of the ramp along with the HSA because the edge of the ramp over the OD may collide with the disks during up/down movement of the ramp.

Some embodiments of the disclosure employ a split ramp including a first ramp portion adjacent to the OD of the disks and a vertically moveable ramp portion that is adjacent to the first ramp portion. To enable up/down movement of the HSA, the HSA is first moved away from the disks and away from the first ramp (if any), and positioned such that the heads are supported on a moveable ramp portion. Then, the HSA and the moveable portion of the ramp are moved in unison by an elevator in the HDD. While particular embodiments of movable ramps are shown in the illustrations, it is to be understood that other ramp configurations can also be used, such as those described in the following commonly owned patent applications, which are hereby incorporated by reference: U.S. application Ser. No. 16/863,287 filed on Apr. 30, 2020, entitled "Split Ramp for Data Storage Devices;" and U.S. application Ser. No. 17/163,983 filed on Feb. 1, 2021, entitled "Ramp Activation Systems for an Elevator Drive." Additionally, a retractable ramp can be used to allow removal of disks 104 from spindle 105.

The drawing figures show illustrative operating environments in which certain embodiments disclosed herein may be incorporated. The operating environment shown in the drawings are for illustration purposes only. Embodiments of the present disclosure are not limited to any particular operating environment. Embodiments of the present disclosure are illustratively practiced within any number of different types of operating environments.

It should be noted that the same reference numerals (or reference numerals indexed in increments of hundreds such as 148, 248, 348, for example) are used in different figures for the same or similar elements. All descriptions of an element also apply to all other versions of that element unless otherwise stated. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

Figure 1B:
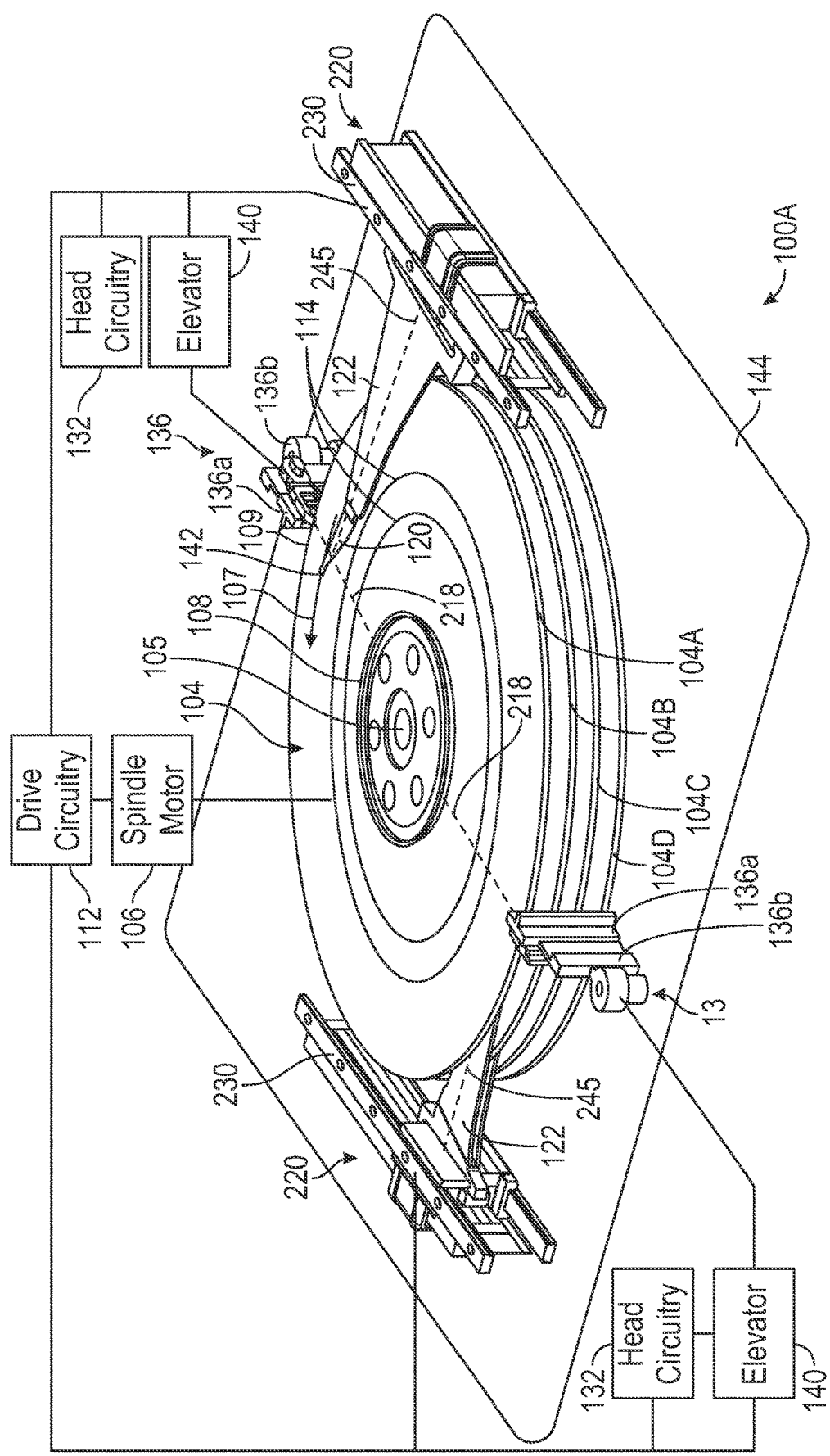
FIG. 1B is a schematic illustration of the data storage device of FIG. 1A with two actuator arms on different disk surfaces.

FIGS. 1A and 1B are schematic illustrations of a data storage device (DSD) including data storage media, heads for reading data from and/or writing data to the data storage media and a split ramp for supporting the heads. In data storage device 100A, heads 102 may be positioned over storage media 104 to read data from and/or write data to the data storage media 104. In an exemplary embodiment, the data storage media 104 are rotatable data storage disks, stacked on spindle 105, with each disk 104 having opposing surfaces that serve as data storage surfaces. For read and write operations, a spindle motor 106 (illustrated schematically) rotates the media 104 as illustrated by arrow 107. A linear actuator assembly 220 positions the heads 102 relative to data tracks 114 on the rotating media 104 between an inner diameter (ID) 108 and an outer diameter (OD) 109. Both the spindle motor 106 and linear actuator assembly 220 are connected to and operated through drive circuitry 112 (schematically shown).

Each of heads 102 is coupled to its respective linear actuator assembly 220 through a suspension assembly that includes a load beam 120 connected to an actuator arm assembly 122 of the mechanism 220. The linear actuator assembly 220 is coupled to a frame or base deck 144. The linear actuator assembly 220 moves the head 102 in a cross-track direction as illustrated by radius 218. Each of the heads 102 includes one or more transducer elements (not shown) coupled to head circuitry 132, such as through a flex circuit. Because two heads 102 can interact with a disk surface, benefits include enabling read after write (RAW) without burning a full revolution, using two heads having differing functionality on the same surface (such as writing with one head and reading with the other head), reducing head duty cycle and increasing reliability, throughput and redundancy, for example.

In general, in order to keep read/write heads 102 from landing on disks 104 in a data storage device when, for example, power is removed from the data storage device, and to prevent the heads 102 from colliding with outer edges of the disks 104 during load and unload operations, a head support ramp assembly 136 is provided adjacent to the OD 109 of the disks 104. In data storage device, a number of heads 102 is less than a number of disk 104 surfaces. In the particular embodiment shown in FIG. 1A, data storage device 100A includes four disks 104A, 104B, 104C, 104D, with a total of 8 data storage surfaces. In an exemplary embodiment, two heads 102 are coupled to each linear actuator assembly 220 through a suspension assembly that includes a load beam 120 connected to an actuator arm assembly 122. The linear actuator assembly 220, the load beams 120 and the actuator arms 122 are collectively referred to as the head stack assembly (HSA) 138.

Figure 2A:
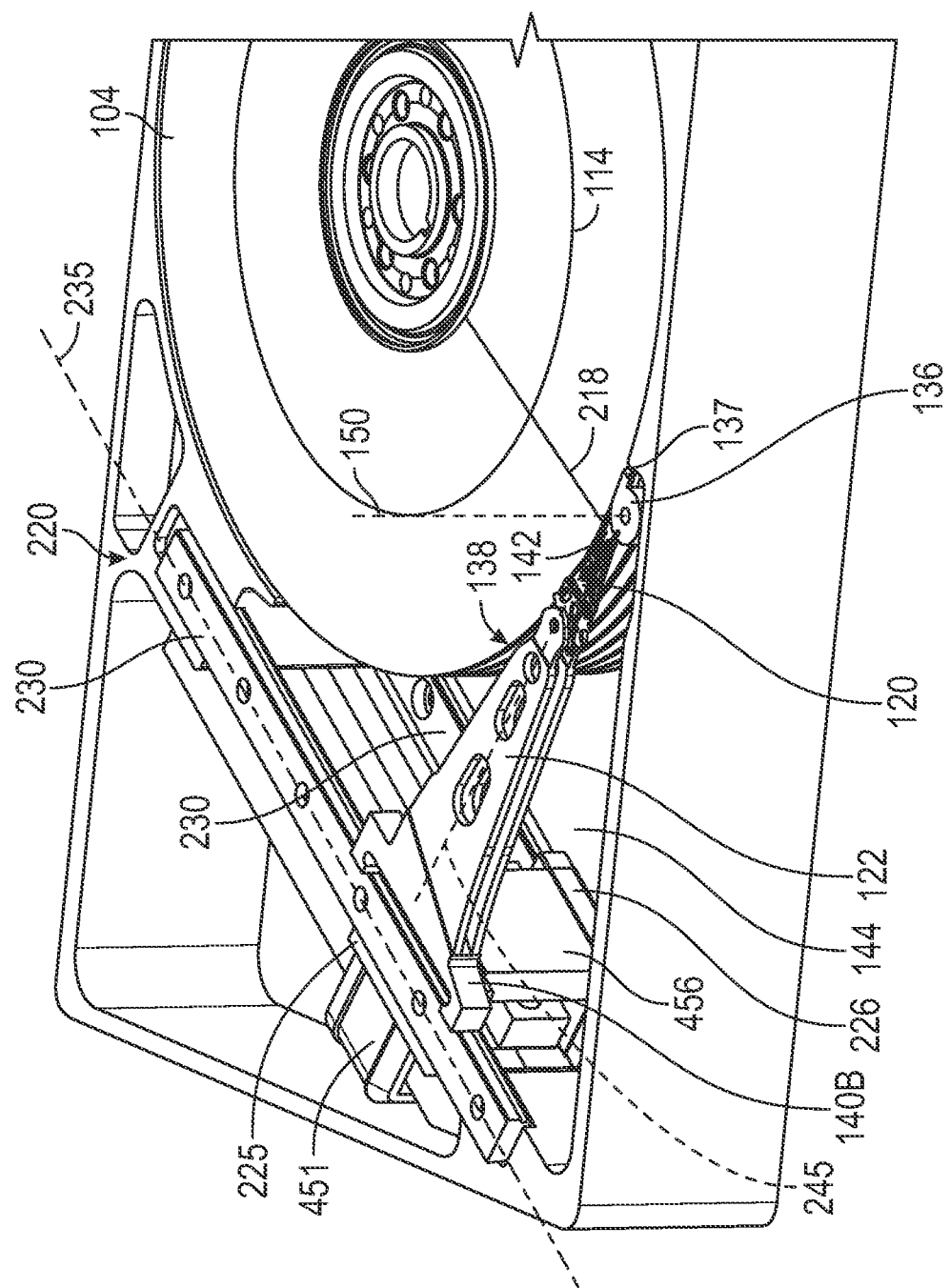
FIG. 2A is a perspective view of a portion of the data storage device of FIGS. 1A and 1B.
Figure 2B:
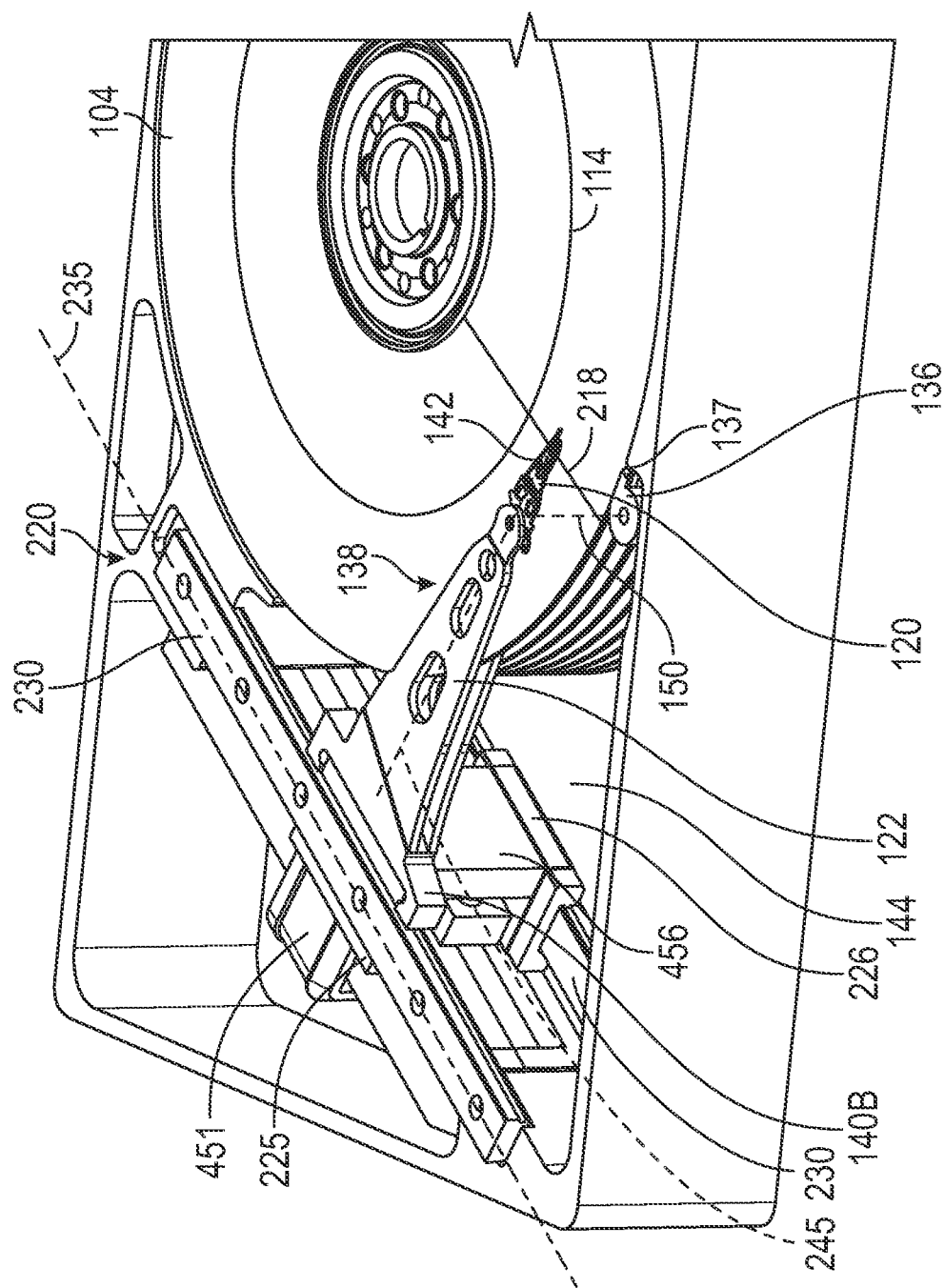
FIG. 2B is similar to FIG. 2A, with the actuator arm in a second position.
Figure 2C:
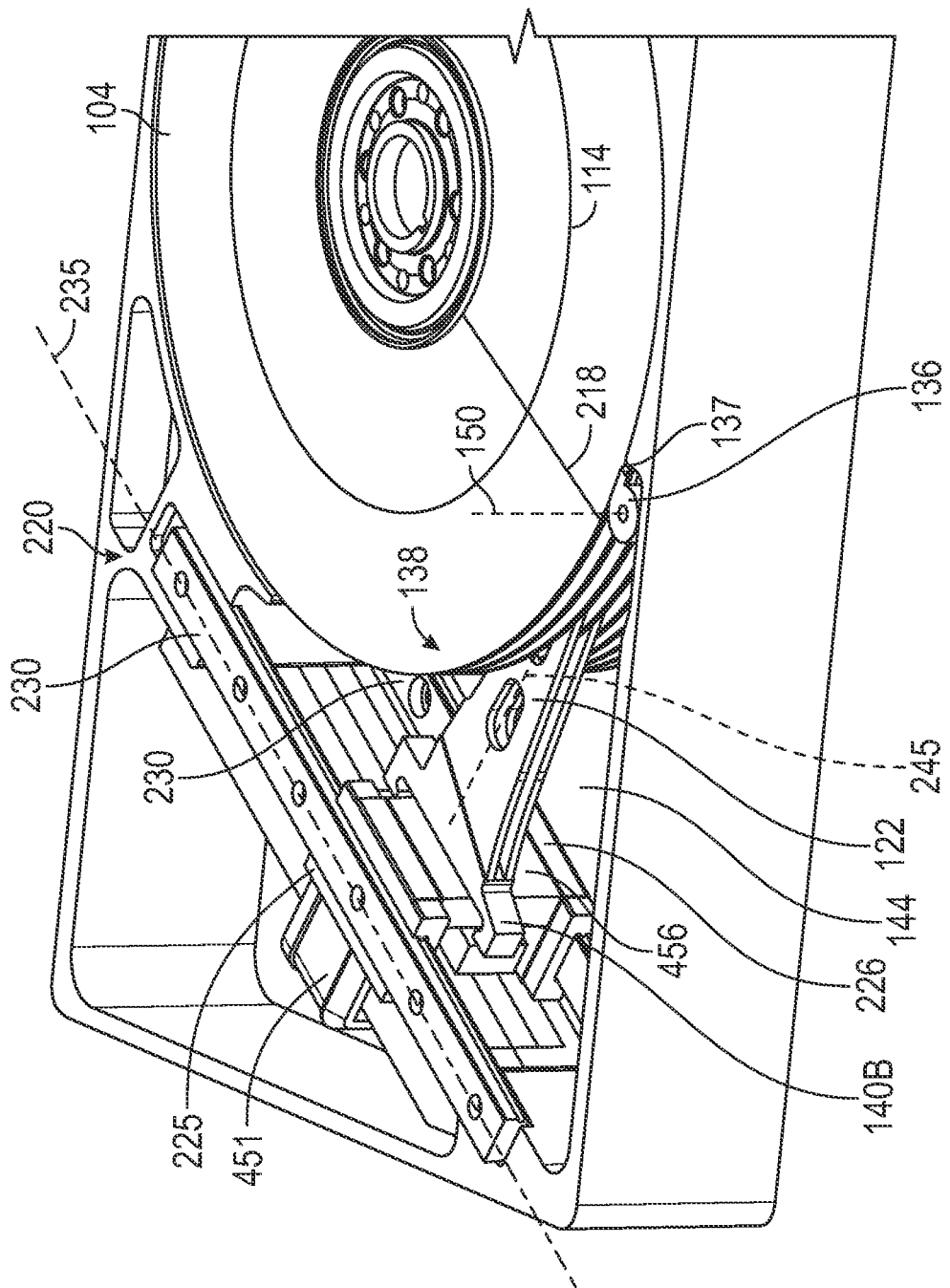
FIG. 2C is similar to FIG. 2A, with the actuator arm in a third position.

In data storage device 100A of FIGS. 1A-2C, the actuator arm assembly 122 may be moved along vertical guide 456 to different positions under motive of an elevator 140. In an uppermost position shown in FIG. 2B, the two heads 102 interact with upper and lower data storage surfaces of disk 104A. In other positions (such as shown in FIG. 2C), which are below the uppermost position, the same two heads interact with data storage surfaces of disks 104B, 104C and 104D.

To enable the up/down movement of the actuator arm assembly 122, head-support ramp 136 in some embodiments is designed as a split ramp with a stationary portion 136a and moveable portion 136b. In order to move the actuator arm assembly 122 from either an upper position to a lower position or from a lower position to an upper position, the HSA 138 is first moved in the x-y plane until a head end 142 of the HSA 138 is supported on the moveable portion 136b of the head-support ramp assembly 136. Then, the actuator arm assembly 122 and the moveable portion 136b are moved in unison (such as vertically or in a z direction) along vertical guide 456 (labeled in FIGS. 2A-2C). An entire ramp 136 or a portion thereof can also be moved in the x-y plane off the disk stack, such as by retraction, flexing, or rotation, for example. In some embodiments, the elevator is operationally connected to both the actuator arm assembly 122 and a movable ramp portion to move both in unison in the z direction. In other embodiments, the movable ramp portion is not operationally connected to the elevator; rather, it is physically connected the actuator arm to move with the arm, and only the arm is operationally connected to the elevator (see FIGS. 5-14).

In one embodiment, a base of elevator 140 may be driven up and down by a coil and a magnet (not shown) with hard stops at both ends that limit the extent of upward and downward movement of the actuator arm assembly 122. In general, any suitable driving mechanism may be used to move elevator 140 up and down. Exemplary drivers for Z direction motion of elevator 140 include a ball screw with an internal motor, a voice coil motor, an inchworm style brake crawler, a linear motor, a shape memory alloy based actuator, and a combination of the above.

Figure 14:
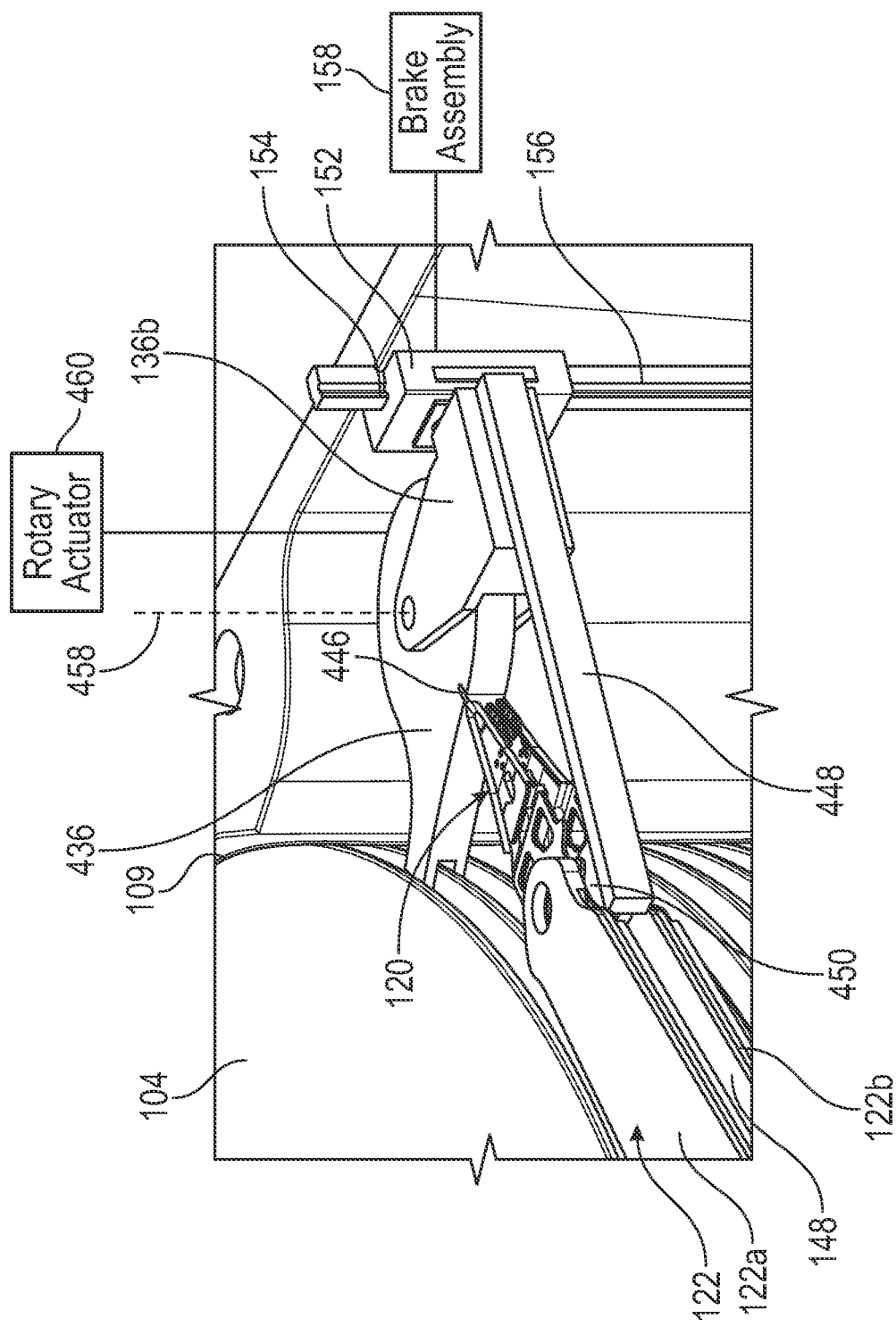
FIG. 14 is a partial perspective view of a data storage device having a fourth exemplary embodiment of a ramp activation system.

Head support ramp assembly 136 supports head end 142 of actuator arm assembly 122 when the actuator arm assembly 122 is moved away from the data storage disk(s) 104. In some embodiments, head support ramp assembly 136 includes a first ramp portion 136a adjacent to the OD 109 of the data storage disk(s) 104 and a second ramp portion 136b adjacent to the first ramp portion 136a. In some embodiments, the first ramp portion 436 may be moveable away from the OD 109. In the embodiment of FIGS. 14-15D, which is described further below, first ramp portion 436 is rotatably movable about pivot axis 458.

Figure 5:
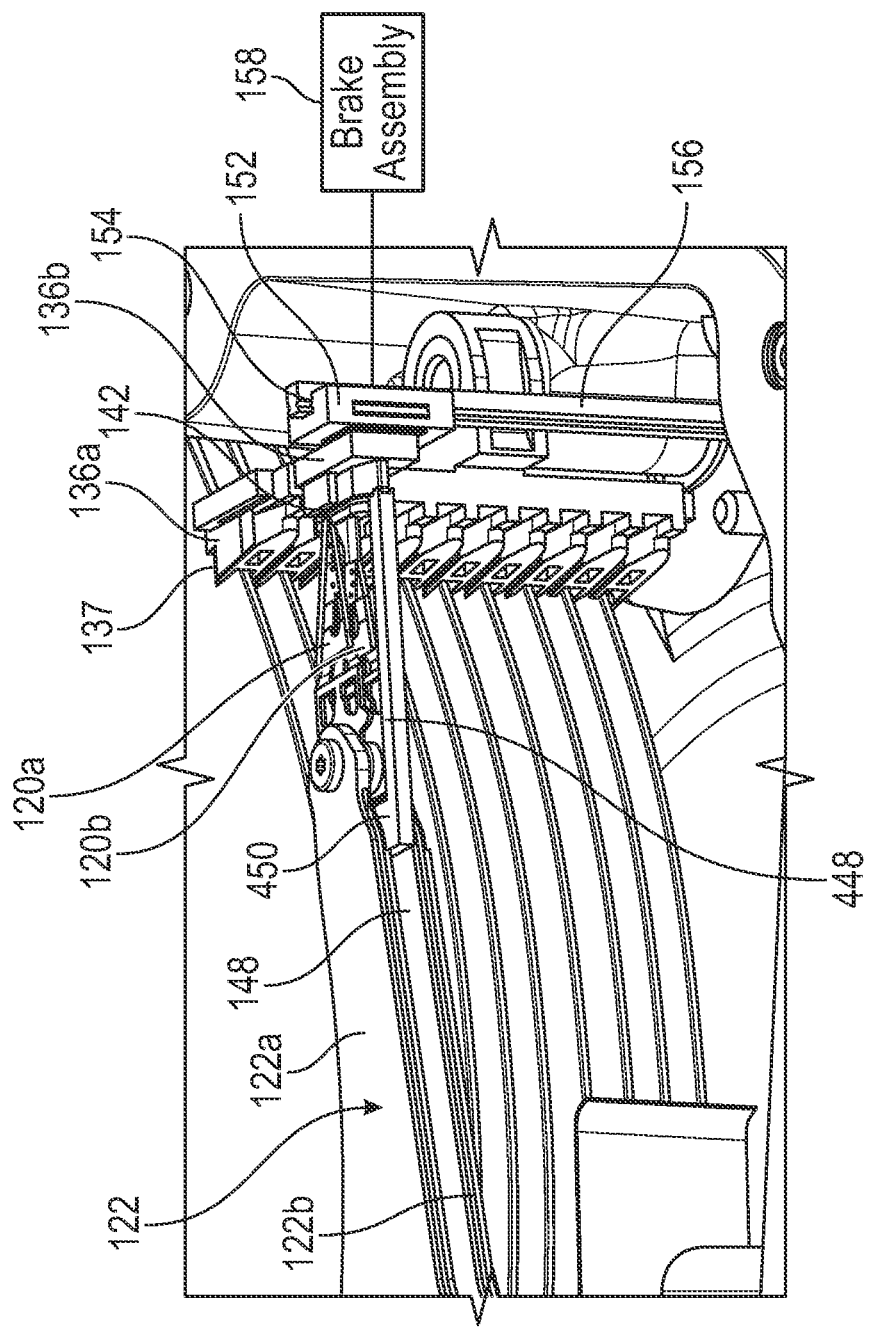
FIG. 5 is a partial perspective view of a data storage device including a first exemplary embodiment of a ramp activation system.
Figure 6:
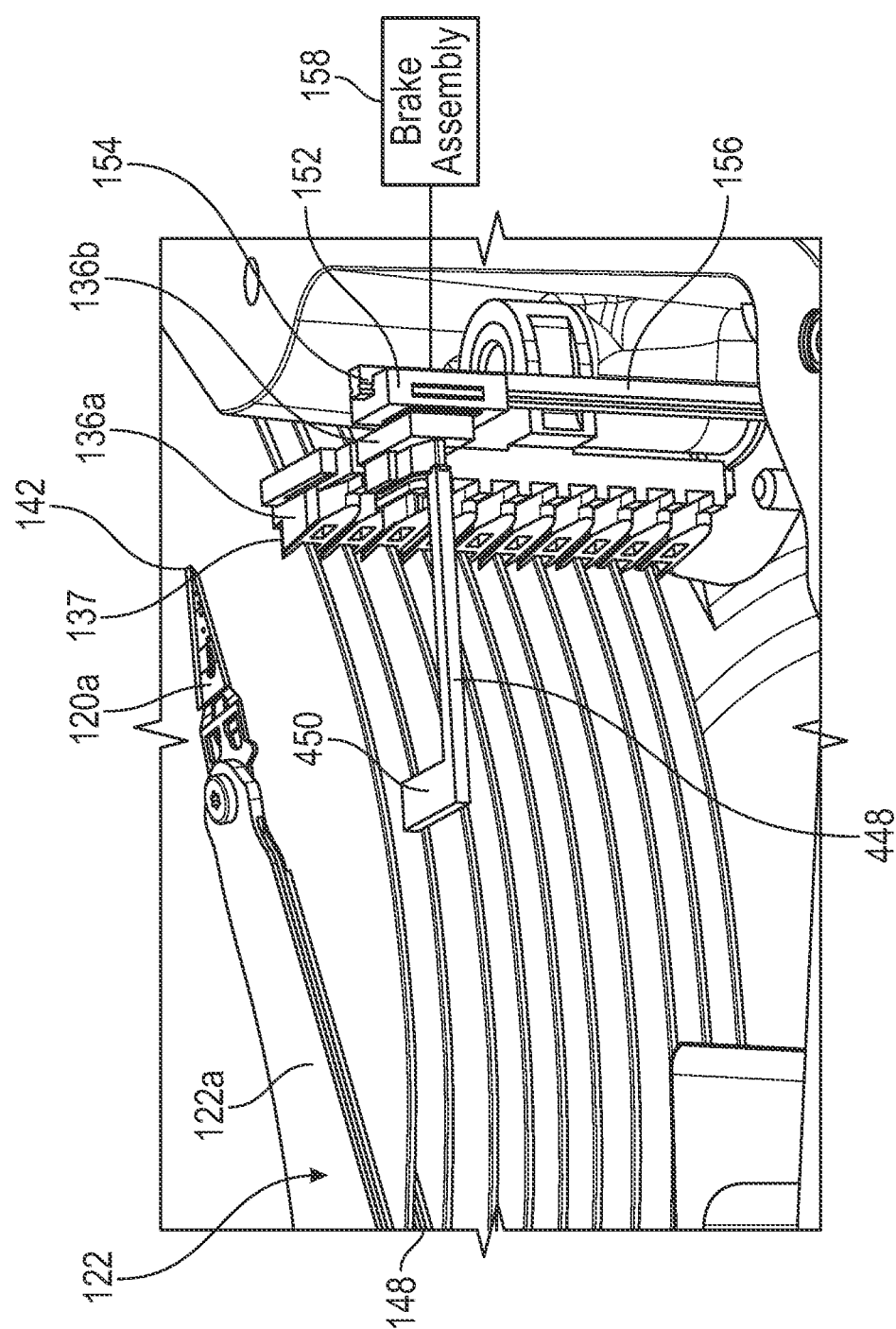
FIG. 6 is similar to FIG. 5 but shows the actuator arm of the data storage device in a read/write position.

As labeled in FIGS. 5 and 6, in some embodiments of a zero skew disk drive system, actuator arm assembly 122 includes upper arm 122a and lower arm 122b separated by channel 148 sized so that the plates 122a, 122b fit over and under a disk 104 without physically contacting the disk 104. Upper load beam portion 120a and lower load beam portion 120b carry heads 102 for reading and writing on top and bottom surfaces of a disk 104. A lift tab 446 extends from the load beam 120 to rest on the head support ramp assembly 136 when the disk drive storage device is in an off or non-operating state. For use of heads 102 for reading and writing data relative to disk 104, actuator 220 is activated to slide the actuator arm assembly 122, to thereby move the head end 142 of the actuator arm assembly 122 off of the head support ramp assembly 136 and to the disk 104. In some illustrations, a movable ramp portion is not shown but may be used with any embodiment of a disk storage device.

A movable ramp portion may move in a vertical z direction or may move in the x-y plane, such as by rotation or retraction, for example.

Returning to FIGS. 1A and 1B, an exemplary embodiment of a zero skew disk drive system is illustrated as data storage device 100A. Data storage device 100A uses a pair of linear actuator assemblies 220 disposed on opposite sides of the disk stack. Each linear actuator assembly 220 allows for zero skew (or fixed skew) throughout the entire stroke of the head stack assembly 138. This allows for increased density of a data storage compared to a device with a rotating arm 122. For example, by configuring the slider to have zero skew throughout the entire stroke of the head 102 at head end 142 of HSA 138, the head 102 may be able to read data immediately after writing the data. In contrast, in a conventional skewed configuration, the angle of the head 102 relative to the data track 114 (such as that resulting from a stroke extending along an arc about an actuator arm pivot axis) may not allow for this immediate reading after writing.

In a zero skew configuration as shown in FIGS. 1A and 1B, the read and/or write pole at head 102, on head end 142, moves linearly along radius 218 and is therefore positioned with no skew or angular offset to a centerline of a track 114. Additional information relevant to high performance of a disk drive is provided in the following commonly owned patent applications and patents, which are hereby incorporated by reference: U.S. application Ser. No. 17/172,684 filed on Feb. 10, 2021, entitled "Adjusting HGA Z-height via HSA Elevator Using Head/Actuator Feedback;" US Published Patent Application No. 2004/0257710 for "Hard drive actuator arm with reduced skew variation;" U.S. Pat. No. 6,987,637 for "Magnetic recording system which eliminates skew angle effect;" U.S. Pat. No. 9,361,919 for "Disk drive with parallel head actuation;" U.S. Pat. No. 10,249,339 for "Read-after-write methodology using multiple actuators moveable over the same magnetic media;" and U.S. Pat. No. 10,818,317 for "Multi-actuator data storage system."

The linear actuator assembly 220 of the data storage device 100A may include one or more rails 230 extending along a rail axis 235 (or a parallel rail axis in the case of more than one rail 230). In an exemplary embodiment, rail axis 235 is parallel to radius 218 of disk 104 on which the head travels. The rails 230 may define any suitable cross-sectional shape, such as square, rectangular, circular, or oval, for example. Further, the rails 230 may include or be formed of any suitable material, such as stainless steel, or titanium, for example.

As shown in FIGS. 1A and 1B, in an exemplary data storage device system 100A, the two head stack assemblies including linear actuator assemblies 220, actuator arms 122 and load beams 120 are positioned on diametrically opposed sides of the stack of disks 104. Accordingly, the radial strokes of heads 102 along the opposed radii 218 are aligned along a single diameter dimension of a disk 104. In one method of operation, the two head stack assemblies are operated synchronously so that the drive circuitry 112 controls both sets of head circuitries 132 and both elevators 140 in tandem. Thus, the two actuator arms 122 travel in a synchronized manner up and down the stack of disks and in and out across the disk surfaces. While two elevators 140 are schematically illustrated, it is contemplated that in embodiment in which both linear actuator assemblies 220 are operated simultaneously in the same manner, the data storage device can include only a single elevator 140 that is operationally connected to both actuator arms 122. In another method of operation, as illustrated in FIG. 1B, the two head stack assemblies are operated independently. Independent operation of the head circuitries 132 and elevators 140 allow for one actuator arms 122 to position its head to interact with a different disk surface and in a different location on the disk relative to the other actuator arm assembly 122.

Figure 3A:
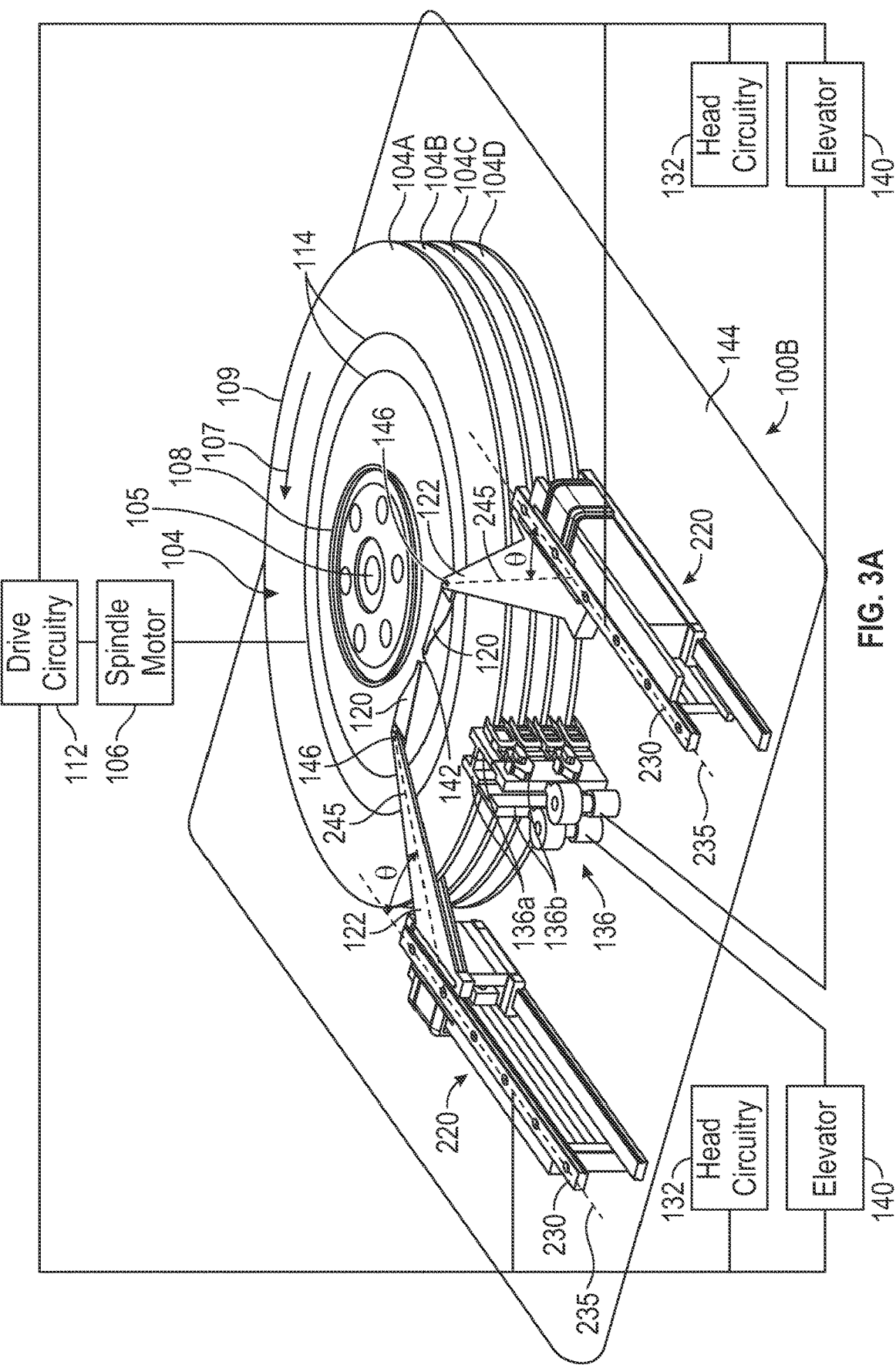
FIG. 3A is a schematic illustration of a second exemplary embodiment of a data storage device.
Figure 3B:
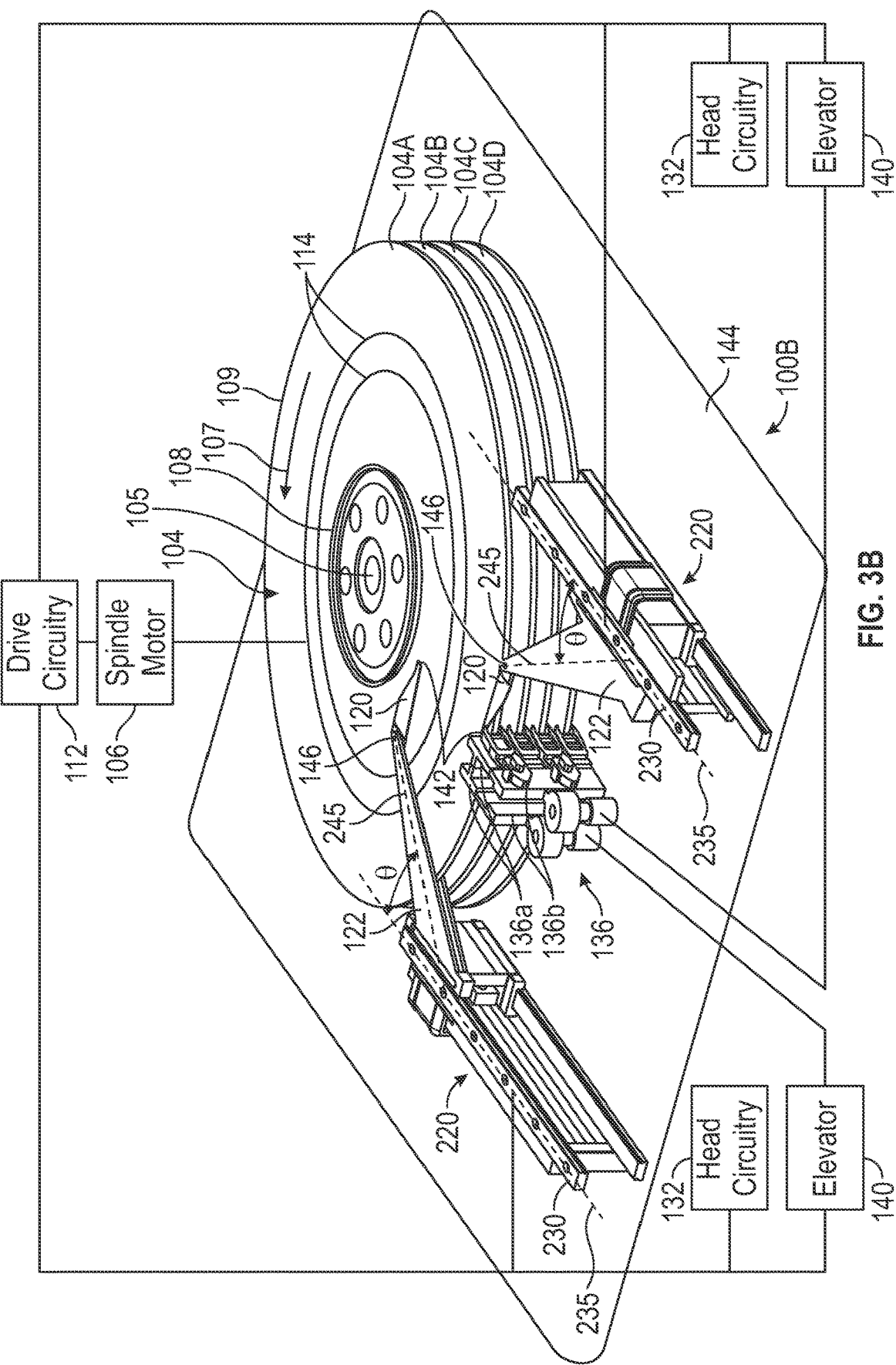
FIG. 3B is a schematic illustration of the data storage device of FIG. 3A in a different configuration.

Referring to FIGS. 3A and 3B, another exemplary embodiment of a zero skew disk drive system is illustrated as data storage device 100B. Data storage device 100B uses a pair of linear actuator assemblies 220 disposed on a common side of the disk stack. With both linear actuator assemblies 220 off to one side of the disk stack, the storage device is no wider than the diameter of the disks 104. The heads 102 of the two load beams 120 can be positioned to interact with a disk at very close locations to each other (such relative to a single data track 114 or two data tracks 114 that are very close to each other). For example, a write operation can be performed by a head on one actuator arm assembly 122, and a read operation can be performed by a second head on a second actuator arm assembly 122 almost immediately thereafter.

The arm axis 245 of each actuator arm assembly 122 is at a fixed angle theta ($\theta$) to the rail axis 235 of slide rails 230. In exemplary embodiments, theta is between about 20 degrees and about 80 degrees. In some embodiments, theta is between about 30 degrees and about 60 degrees. The load beam 120 is pivoted with respect to the actuator arm assembly 122 to align with a disk track 114 (see FIG. 4). FIG. 3A shows both head ends 142 of load beam 120 close to the inner diameter 108 of the disk 104. FIG. 3B shows one arm 122 slid to the left so that the head end 142 of one load beam 120 rests on the ramp assembly 136. Each linear actuator assembly 220 allows for zero skew (or fixed skew) throughout the entire stroke of the head stack assembly 138.

Figure 4:
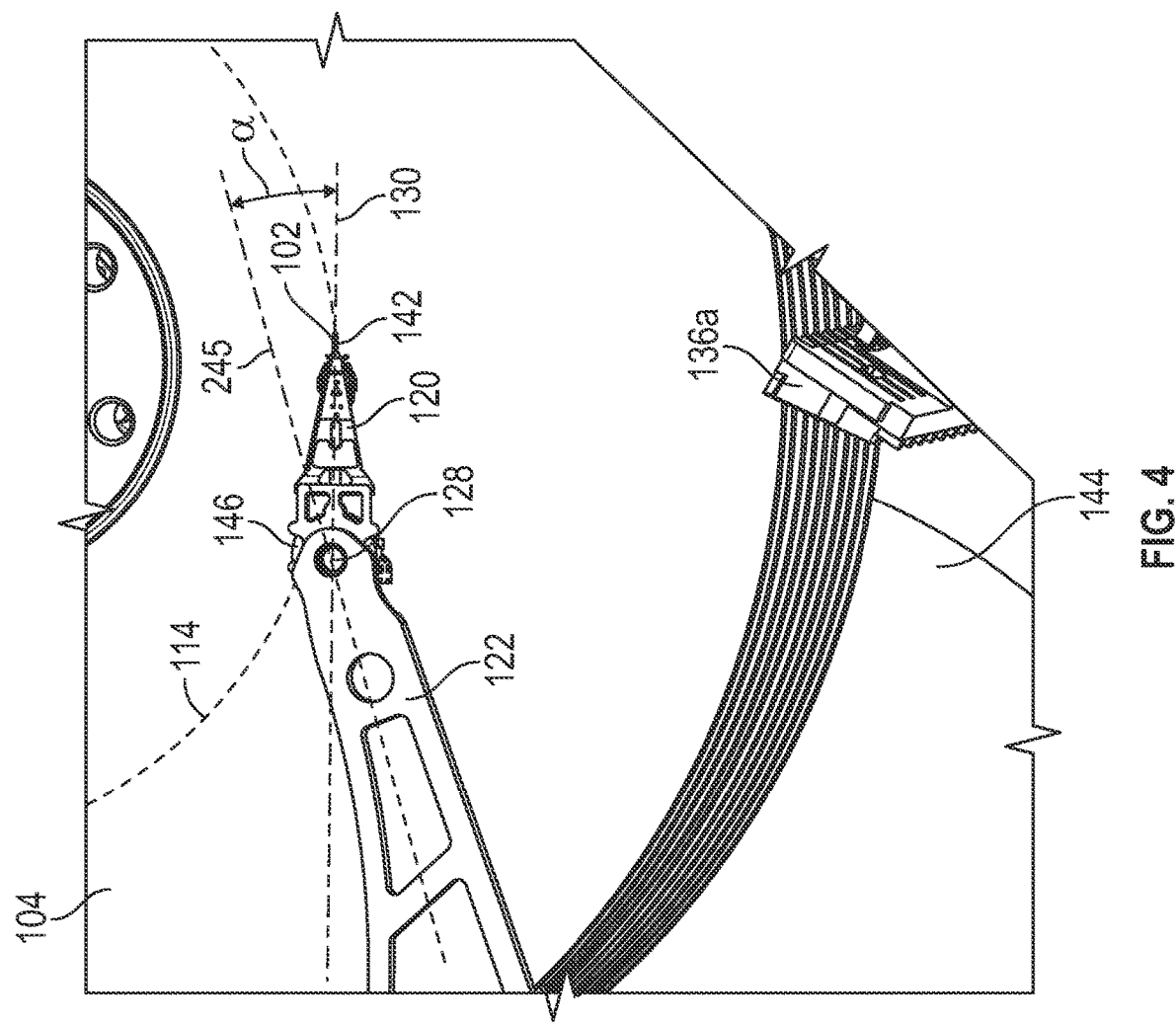
FIG. 4 is a perspective view of a portion of the data storage device of FIG. 3B.

The actuator arm assembly 122 is movably attached to the rails 230 such that motion in the x-y plane is restricted to sliding motion along the rails 230. In other words, the actuator arm assembly 122 may be movably attached to the rails 230 so that the actuator arm assembly 122 moves linearly and, therefore, the at least one head 102 also moves linearly relative to the recording medium 104. For the disk drive system 110B shown in FIGS. 3A and 3B, in most positions of actuator arm assembly 122 on disk 104, there is some skew between the arm axis 245 and the true track orientation of a track 114. Accordingly, as shown in FIG. 4, the load beam 120 is rotated relative to the actuator arm assembly 122 at a pivot axis 128 to eliminate (or substantially eliminate) any skew angle and align the head 102 with a selected track 114. As shown in FIGS. 3A-4, HGA 138 is able to position head 102 relative to disk 104 in a selected cross disk position by sliding along rail 230. A corrected zero skew orientation of the head 102 relative to any particular track 114 is provided by rotation of load beam 120 relative to actuator arm assembly 122 about a pivot axis 128. As shown in FIG. 4, pivot bearing 146 connects upper load beam portion 120*a* to upper load arm 122*a* and connects lower load beam portion 120*b* to lower load arm 122*b*. A suitable pivot pin or other connector is not shown so as to not obstruct a view of the discussed components.

As shown in FIGS. 3A and 3B, the actuator arm assembly 122 moves in a linear direction across the disk 104. In a case where the sweep of head 102 is very close to a radius of the disk, an angle alpha ($\alpha$) (labeled in FIG. 4) of the load beam axis 130 relative to the actuator arm axis 245 stays substantially constant for the entire stroke of motion of head 102 between the inner diameter 108 and the outer diameter 109. Thus, a pivot pin can be fixed to maintain a set angle alpha for the system 100B to align head 102 with a selected data track 114 with little or no skew.

In another case, where the sweep of head 102 is farther from a radius of the disk, an angle of the head may need correction over the stroke of motion of head 102 between the inner diameter 108 and the outer diameter 109 in order to maintain alignment with different data tracks 114. In that case, an actuator (such as a MEMS (micro-electromechanical system) based actuator or VCM based actuator or piezoelectric actuator, for example) at pivot bearing 146 is used in an exemplary embodiment for controlling and changing the angle alpha of the load beam 120 relative to the actuator arm assembly 122 to align head 102 with a selected data track 114 with little or no skew, as described in commonly owned U.S. application Ser. No. 17/233,818 filed on Apr. 19, 2021, entitled "Zero Skew Elevator System."

Descriptions of linear actuator assemblies 220 are applicable to all depictions of data storage system 100A, 100B of this specification. As shown in FIGS. 2A-2C, the actuator arm assembly 122 is movably coupled to the rails 230 via elevator 140B which is in turn mounted on or more sliding brackets 225, 226. In another exemplary embodiment, as shown in FIGS. 16-19, the actuator arm assembly 122 is movably coupled to the rails 230 via bracket 452 that is in turn mounted on or more sliding brackets 225, 226; the bracket 452 is selectively engageable to elevator 140C. As illustrated, top sliding bracket 225 is movably attached to the top rail 230 and a bottom sliding bracket 226 is movably attached to the bottom rail 230. However, in one or more embodiments, the data storage device system may include any number of rails and sliding brackets movably attaching the elevator 140 to the rails 230.

Actuator arm assembly 122 is coupled to elevator 140 in a way that allows z direction motion of the actuator arm assembly 122 relative to the stack of recording media, so that the head end 142 of HSA 138 can access different disks 104 of the stack. By restricting motion of the actuator arm assembly 122 to x-y plane movement only parallel to rail axis 235, and by restricting motion of the actuator arm assembly 122 to z plane movement only normal to the x-y motion, this arrangement stabilizes the actuator arm assembly 122 even while allowing it to reach any desired position on the recording media. In other words, the actuator arm assembly 122 is prevented from moving in other rotational or directional ways (such as tilting, for example).

In an exemplary embodiment shown in FIGS. 2A-2C, the linear actuator assembly 220 of the data storage device includes a linear motor 451 adapted to move the elevator 140B and its connected actuator arm assembly 122 relative to the rails 230. The linear motor 451 may include any suitable type of motor that moves the actuator arm assembly 122 linearly along the rails 230. For example, the linear motor 451 may include a linear stepper motor, an inchworm motor, a linear voice coil motor, ball screw and gear motor, for example.

In a case in which the linear motor 451 includes a linear stepper motor, a permanent alternating magnet is fixed to a drive base extending parallel to the rails 230. For example, the permanent alternating magnet may alternate polarities along a length of the permanent alternating magnet. The elevator 140B may include two or more dynamic magnets (e.g., electromagnets) that interact with the permanent alternating magnet. For example, the system may send a signal to the dynamic magnets to change polarity (such as to switch on and off) so that the dynamic magnets on the elevator 140B move along the permanent alternating magnet extending along and between rails 230 due to attractive and repellant forces formed therebetween.

Figure 20:
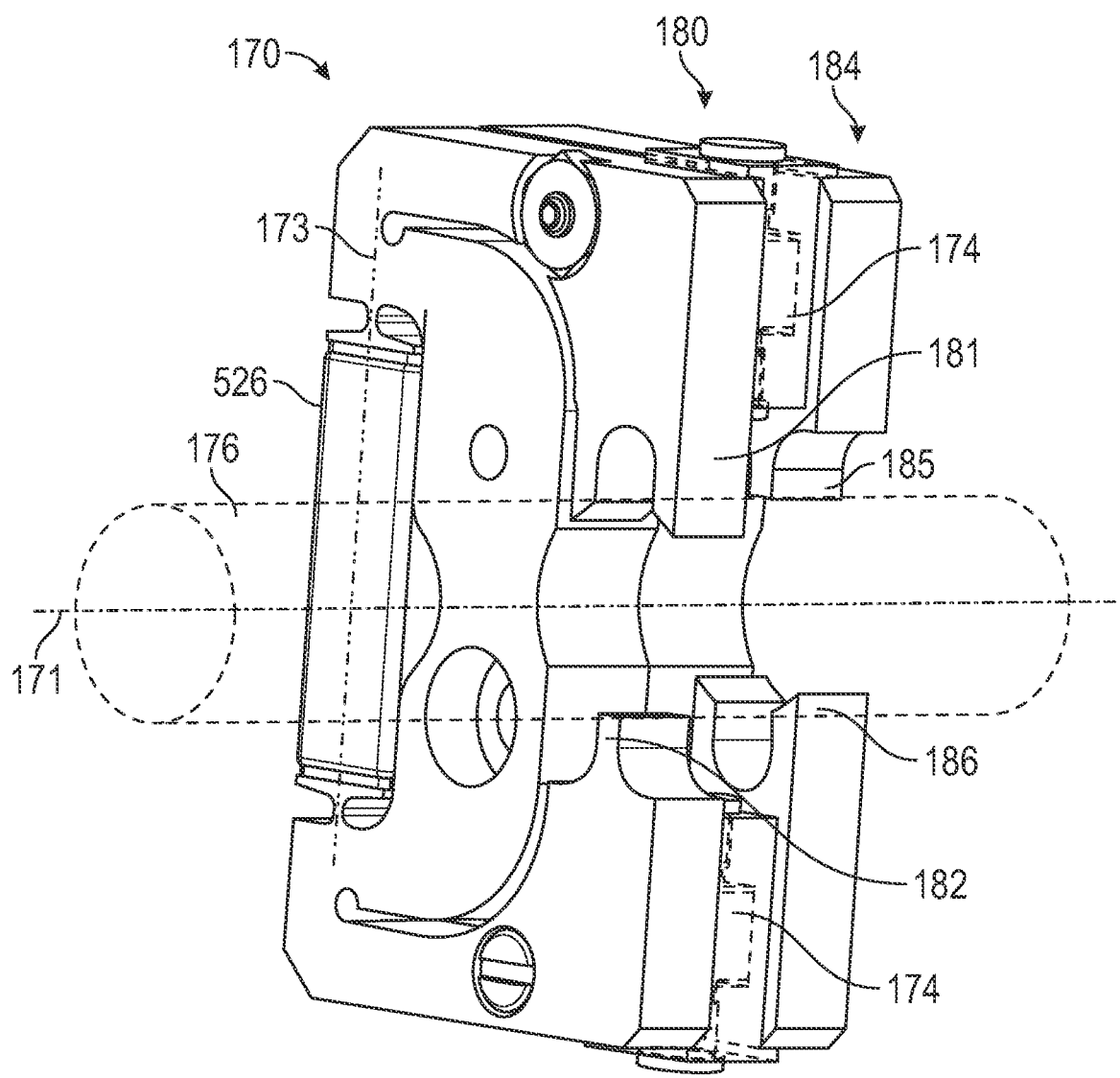
FIG. 20 is a perspective view of an exemplary linear inchworm motor.

In one or more embodiments, the linear motor 451 may include an inchworm motor 170, such as shown in FIG. 20. The inchworm motor 170 may be coupled to an actuator arm (not shown in FIG. 20) to move the actuator arm linearly on and/or parallel to shaft 176 and rail 230. For example, the inchworm motor 170 may be movably coupled to a shaft 176 that extends along a longitudinal axis 171. The shaft 176 may be coupled to the base deck 144 parallel to rail 230. As the inchworm motor 170 moves along the shaft 176, the actuator arm assembly 122 coupled to the inchworm motor 170 also moves linearly along the longitudinal axis 171.

In an exemplary embodiment, inchworm motor 170 includes one or more lateral piezoelectric actuators 174 that extend and retract along the longitudinal axis 171, and one or more piezoelectric clutch actuators 526 that extend and retract in a direction perpendicular to the longitudinal axis 171. In an exemplary embodiment, the inchworm motor 170 includes a first grip 180 having a first piezoelectric clutch 526 and a second grip 184 having a second piezoelectric clutch 526.

When the first piezoelectric clutch 526 extends (such as along axis 173), fingers 181, 182 of the first grip 180 move closer together to contact the shaft 176. When the first piezoelectric clutch 562 retracts (e.g., along axis 173), the fingers 181, 182 of the first grip 180 move farther apart to space away from the shaft 176. Similarly, when the second piezoelectric clutch 562 extends, fingers 185, 186 of the second grip 184 move closer together to contact the shaft 176, and when the second clutch piezo retracts, the fingers 185, 186 of the second grip 184 move farther apart to space away from the shaft 176. Further, the one or more lateral piezoelectric actuators 174 expand to move the first and second grips 180, 184 apart from one another and retract to move the first and second grips 180, 184 closer to one another.

For the inchworm motor 170 to move relative to the shaft 176, the actuators act in a specific sequence to create linear movement along the shaft 176. The process starts by actuating the piezoelectric clutch farthest from the desired movement direction. For example, first piezoelectric clutch 172 extends such that the first grip 180 contacts shaft 176. Next, the lateral piezoelectric actuator 174 extends to move the first grip 180 relative to the second grip 184 to increase the distance therebetween. The second piezoelectric clutch 172 extends such that the second grip 184 contacts the shaft 176, and the first piezoelectric clutch 172 retracts to release contact of the first grip 180 from the shaft 176. Then, the lateral piezoelectric actuator 174 retracts to move the first grip 180 relative to the second grip 184 to decrease the distance therebetween. Thereafter, the first piezoelectric clutch 172 extends such that the first grip 180 contacts the shaft 176, and the second piezoelectric clutch retracts to release contact of the second grip 184 from the shaft 176. This process is repeated multiple times to move the piezo inchworm motor 170 (and the actuator arm assembly 122 attached thereto) relative to the shaft 176 in a direction from the first grip 180 to the second grip 184. In order to move in the opposite direction, the first and second piezoelectric clutches would be switched in the process above.

In another case, the linear motor 451 includes a linear voice coil motor having a permanent alternating magnet fixed to a drive base extending parallel to the rails 230. For example, the permanent alternating magnet may alternate polarities along a length of the permanent alternating magnet. Brackets 225, 226 are attached to a voice coil that interacts with the permanent alternating magnet. For example, the system may send a signal to the voice coil to change polarity such that the voice coil moves along the permanent alternating magnet due to attractive and repellant forces formed therebetween. Furthermore, the voice coil may encircle the permanent alternating magnet. In another embodiment, the permanent alternating magnet and the voice coil may be in a different arrangement than described.

Whatever mechanism is used in linear motor 451, its motion moves brackets 225, 226 along rails 230. The brackets 225, 226 are attached to elevator 140B, which in turn carries actuator arm assembly 122. Accordingly, activation of linear motor 451 causes actuator arm assembly 122 and its head 102 to move linearly with the brackets 225, 226 along rails 230. As such, as shown in a comparison between FIGS. 2A and 2B, the at least one head 102 positioned on the distal end 142 of the actuator arm assembly 122 moves in a straight line radially on the recording medium 104. Thus, for the entire stroke of motion along radius 218, no skew is introduced between the head 102 and a disk track, of which one track 114 is an example.

As shown in FIG. 2A, when the head end 142 of actuator arm assembly 122 rests on ramp 136, in an embodiment in which ramp 136 is movable vertically, elevator 140B is actuated to move actuator arm assembly 122 vertically up and down the stack of disks 104. FIG. 2C shows a configuration in which the elevator 140B has lowered actuator arm assembly 122 in the z direction, and linear motor 451 has also moved actuator arm assembly 122 along rails 230 so that the read/write head can access a track on a lower disk of the stack.

As shown in FIGS. 5 and 6, in a first embodiment of a ramp activation system used with an elevator drive, actuator arm assembly 122 includes upper arm 122a and lower arm 122b separated by channel 148. Upper load beam portion 120a and lower load beam portion 120b carry heads 102 for reading and writing on top and bottom surfaces of a disk 104. A lift tab 446 (not shown in FIGS. 5 and 6) extends from the load beam 120 to rest on the head support ramp assembly 136 when the disk drive storage device is in an off or non-operating state. Bracket 448 is attached to moveable ramp 136b and is configured for selective engagement to, and disengagement from, actuator arm assembly 122. In an exemplary embodiment, engagement of moveable ramp 136b to actuator arm assembly 122 is accomplished by insertion of end portion 450 of bracket 448 into channel 148 of actuator arm assembly 122, as shown in FIG. 5. In an exemplary embodiment, disengagement of actuator arm assembly 122 from moveable ramp 136b is accomplished by sliding actuator arm on rail 230 so that its channel 148 is free from end portion 450 of bracket 448, as shown in FIG. 6. In an exemplary embodiment, moveable ramp 136b includes a linear slider 152 mounted with a linear bearing 154 on vertical guide post 156.

In the illustrated engaged configuration between actuator arm assembly 122 and moveable ramp 136b shown in FIG. 5, as elevator 140 is activated to raise and lower actuator arm assembly 122, the moveable ramp 136b, which is connected to actuator arm assembly 122 by bracket 448, moves with the actuator arm assembly 122 up and down along vertical guide post 156. Thus, unified motion of the actuator arm assembly 122 with the head components 102 thereon, as well as the moveable ramp 136b on which the head end 142 rests, is accomplished even though there is no direct connection between the elevator 140 and the moveable ramp 136b.

For use of heads 102 for reading and writing data relative to disk 104, actuator 220 is activated to slide the actuator arm assembly 122 on rail 230, to thereby move the head end 142 of HSA 136 off of the head support ramp assembly 136 and to the disk 104, as shown in FIG. 6. With bracket 448 thus disengaged from channel 148 of actuator arm assembly 122, brake assembly 158 (shown schematically) is used to maintain moveable ramp 136b in the location last achieved. In the illustrated embodiment, end portion 450 of bracket 448 is located on one end of moveable ramp 136b, and vertical guide post 156 is located on an opposite end of moveable ramp 136b.

Figure 7:
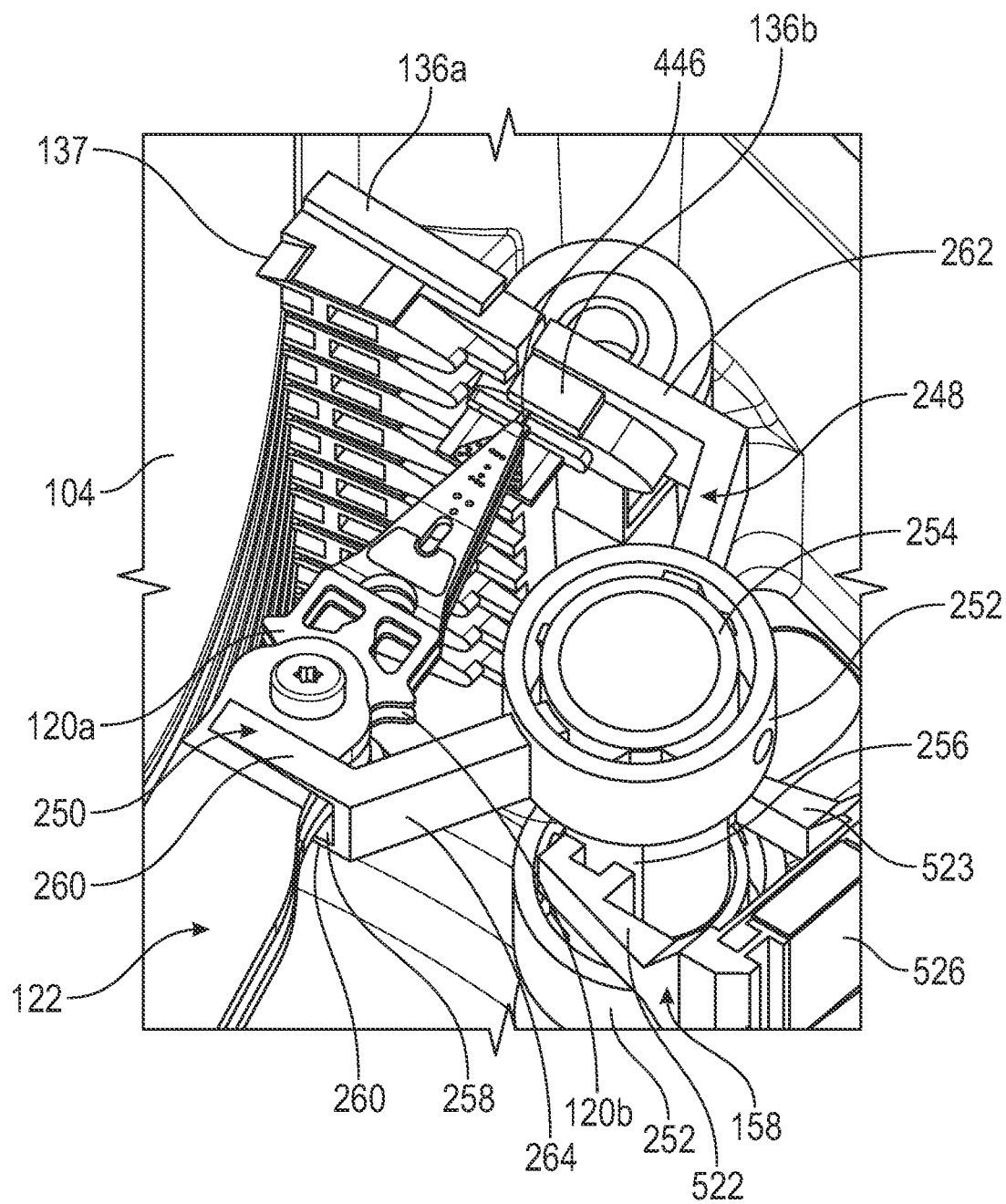
FIG. 7 is a partial perspective view of a data storage device including a second exemplary embodiment of a ramp activation system.
Figure 8:
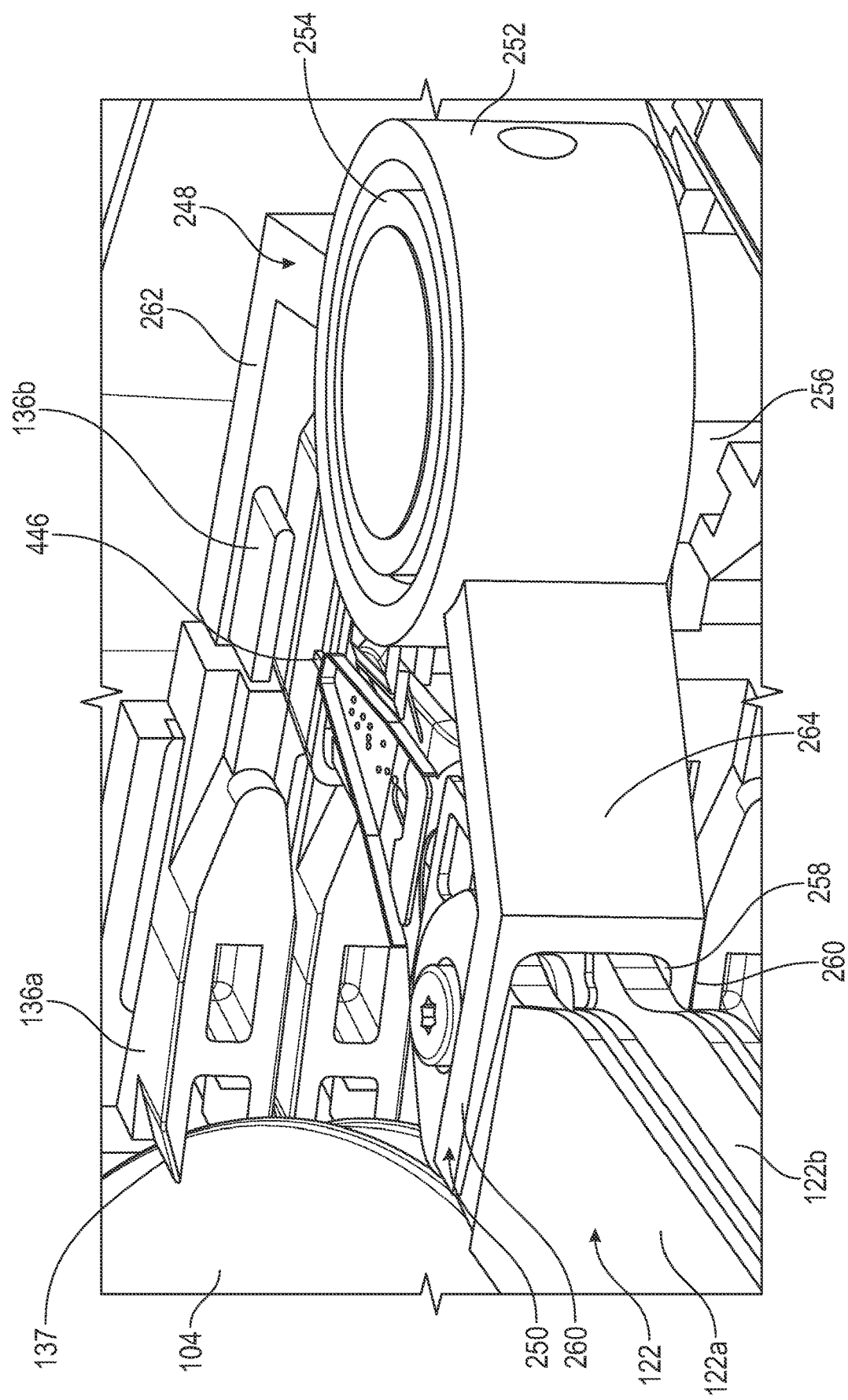
FIG. 8 is a partial perspective view of a data storage device, showing the ramp activation system of FIG. 7 from a different angle.
Figure 9:
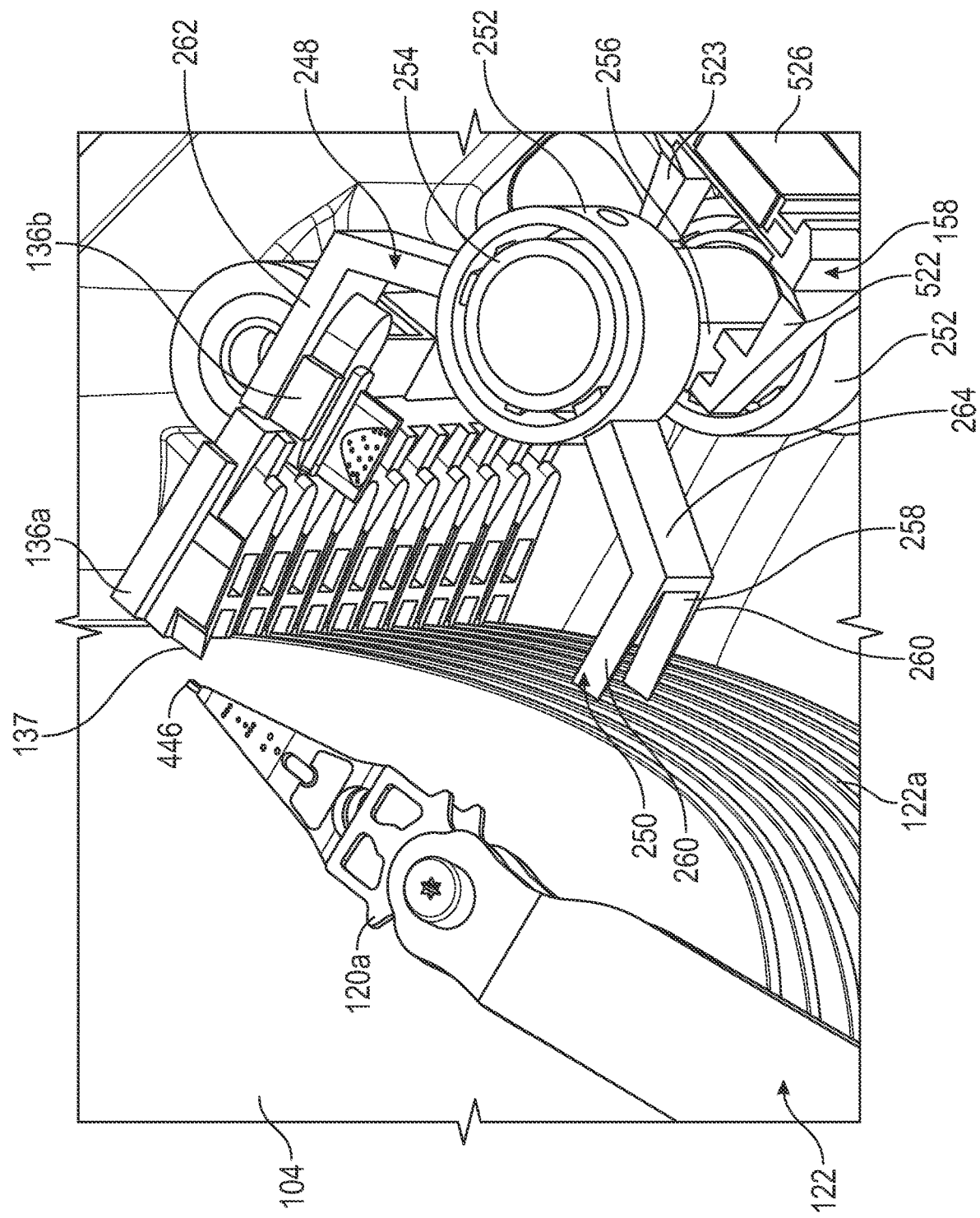
FIG. 9 is similar to FIG. 7 but shows the actuator arm in a read/write position.

FIGS. 7-9 illustrate a second exemplary embodiment of a ramp activation system for data storage device 100A, 100B. Bracket 248 is attached to moveable ramp 136b and is configured for selective engagement to, and disengagement from, actuator arm assembly 122. In an exemplary embodiment, engagement of moveable ramp 136b to actuator arm assembly 122 is accomplished by insertion of a portion of actuator arm assembly 122 into cleft 258 between fingers 260 of end portion 250 of bracket 248, as shown in FIGS. 7 and 8. In an exemplary embodiment, disengagement of actuator arm assembly 122 from moveable ramp 136b is accomplished by sliding actuator arm on rail 230 so that it is free from end portion 250 of bracket 248, as shown in FIG. 9. In an exemplary embodiment, moveable ramp 136b having bracket 248 includes cylindrical linear (vertical) sliders 252 mounted with cylindrical bearings 254 on vertical guide post 256.

In the illustrated engaged configuration between actuator arm assembly 122 and moveable ramp 136b shown in FIGS. 7 and 8, as elevator 140 is activated to raise and lower actuator arm assembly 122, the moveable ramp 136b, which is connected to actuator arm assembly 122 by bracket 248, moves with the actuator arm assembly 122 up and down along vertical guide post 256. Thus, unified motion of the actuator arm assembly 122 with the head components 102 thereon, as well as the moveable ramp 136b on which the head end 142 rests, is accomplished even though there is no direct connection between the elevator 140 and the moveable ramp 136b.

For use of heads 102 for reading and writing data relative to disk 104, actuator 220 is activated to slide actuator arm assembly 122 on rail 230, to thereby move the head end 142 of HSA 136 off of the head support ramp assembly 136 and to the disk 104, as shown in FIG. 9. With bracket 248 thus disengaged from actuator arm assembly 122, brake assembly 158 is used to maintain moveable ramp 136b in the location last achieved.

Bracket 248 is attached to moveable ramp 136b to be moved up and down vertical guide post 256, which includes cylindrical bearings 254, upon cylindrical linear sliders 252. In an exemplary embodiment, end portion 250 of bracket 248 is configured with a cleft 258 between two horizontal fingers 260. Actuator arm assembly 122 engages with bracket 248 by insertion of the upper and lower arm 122a, 122b into cleft 258 between fingers 260.

In the illustrated configuration, vertical guide post 256 is located between end portion 250 and moveable ramp 136b. In an exemplary embodiment, bracket 248 is not substantially straight. Rather, bracket portion 262 proximate moveable ramp 136b and bracket portion 264 proximate end portion 250 meet at non-linear angles around vertical guide post 256. This configuration allows for more space between the load beam 120 and the nearby vertical guide post 256, as shown in the "parked" configuration of FIGS. 7 and 8.

Figure 11:
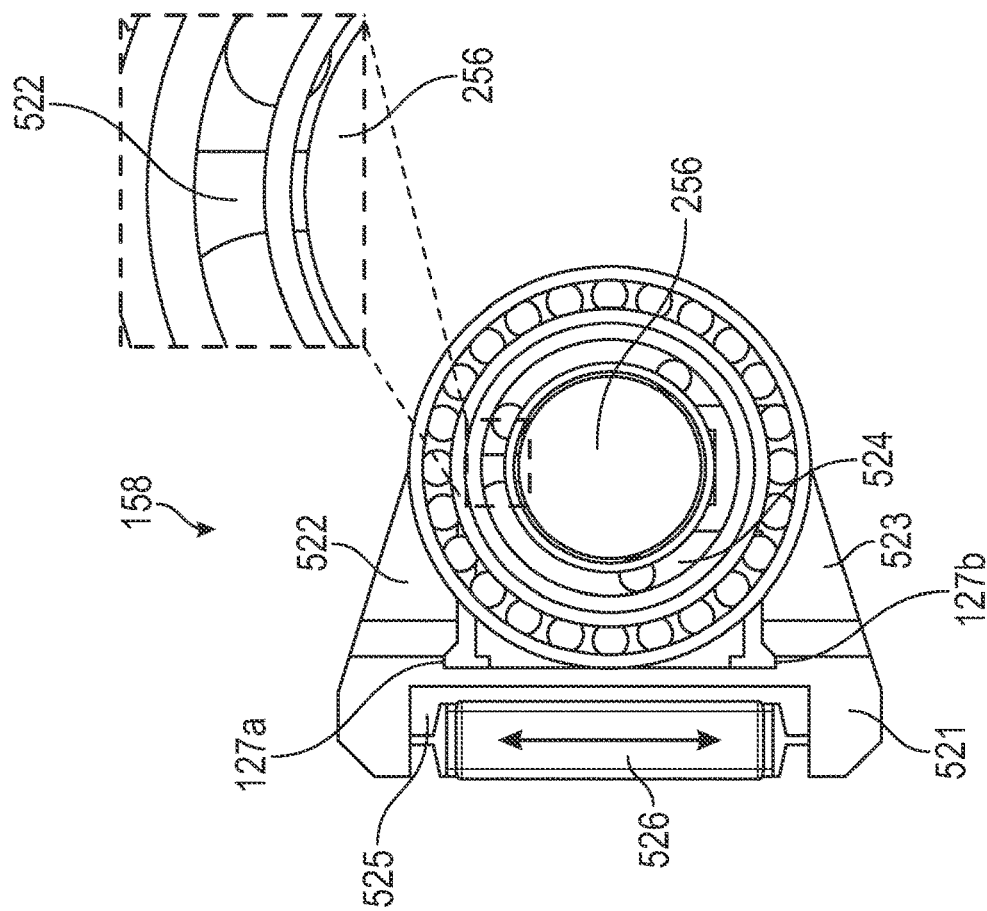
FIG. 11 is a top plan view of the brake assembly of FIG. 10, with the brake activated.
Figure 10:
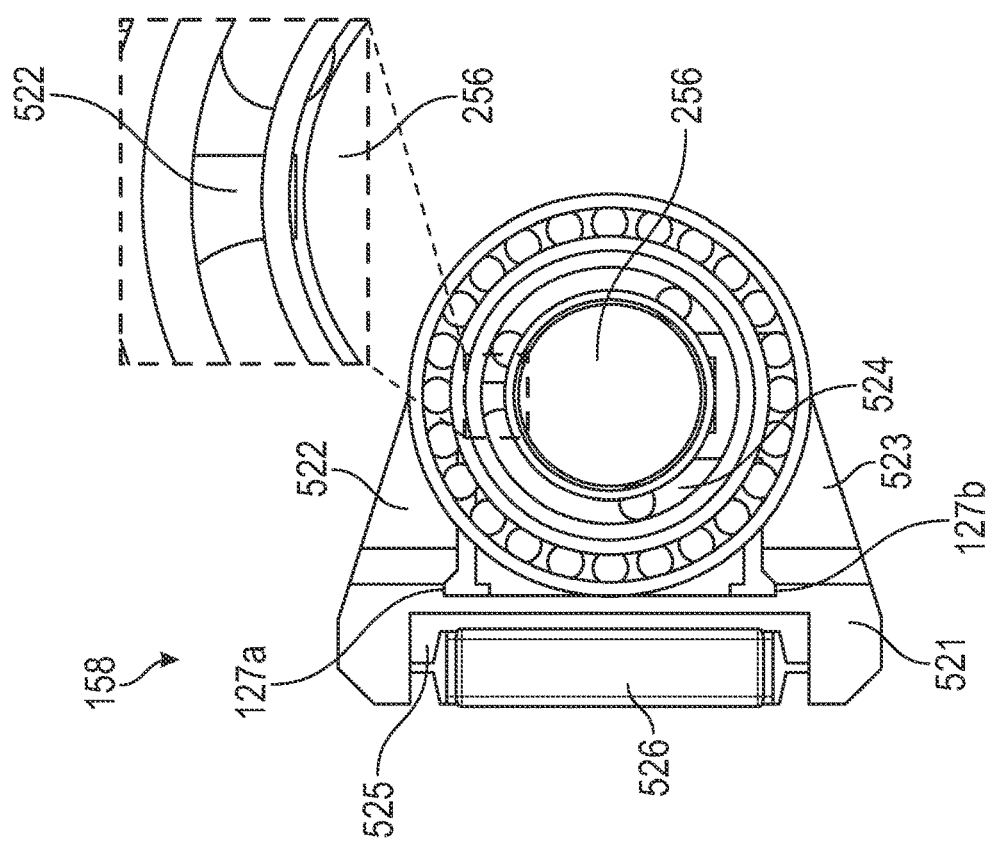
FIG. 10 is a top plan view of a brake assembly suitable for use on a ramp activation system, with the brake deactivated.

In an exemplary embodiment, as shown in FIGS. 10 and 11, the brake assembly 158 generally includes a first clamp arm 522 generally located at one end of a base portion 521, while the second clamp arm 523 is located at the opposite end of the base portion 521. The first clamp arm 522 and the second clamp arm 523 extend from the base portion 521 in the same direction, such that they define an opening 524 between the first and second clamp arms 522, 523. When the brake assembly 158 is mounted on the vertical guide post 156, 256, 356 the vertical guide post 156, 256, 356 resides within in the opening 524.

The base portion 521 include a recess 525 within which is disposed an actuator element 526 configured to move the arms 522, 523 when activated. Reference herein to an actuator element may include any type of device capable of moving arms 522, 523. For sake of simplicity, this Detailed Description will refer to an actuator element as a piezoelectric element, which is one type of suitable actuator element that changes in size when activated to thereby move arms 522, 523. However, it should be appreciated that many other types of actuator elements are also suitable, such as magnetic or shape memory alloys or bimetallics. The piezoelectric element 526 may be sized such that it has approximately the same length as the recesses 525 when in a non-activated state (shown in FIG. 10). In this manner, when the piezoelectric element 526 is activated to expand in size, such as expansion in the length direction shown by the arrow in FIG. 11, the piezoelectric element 526 pushes against the base portion 521 at the ends of the recess 525.

The movement of the piezoelectric element 526 against the ends of the recess 525 as described above allows for the terminal ends of the first and second clamp arms 522, 523 to move closer together. In some embodiments, such movement of the terminal ends of the clamp arms 522, 523 in response to the expansion of the piezoelectric elements is based on the clamp arms 522, 523 being connected with the base portion 521 at flex points or hinges 527a, 527b. When the vertical guide post 156, 256, 356 is disposed in the opening 524, this movement together of terminal ends of clamp arms 522, 523 results in a clamping force being exerted against the vertical guide post 156, 256, 356 as shown in FIG. 11. As discussed in greater detail below, this clamping force allows for the brake assembly 158 to lock in place at any z position along the length of the vertical guide post 156, 256, 356.

In FIG. 10, the piezoelectric element 526 is in a non-activated (e.g., non-expanded) state. The piezoelectric element 526 resides against the base portion 521 at the ends of the recess 525 but does not push against the ends of the recess 525. As shown in the inset of FIG. 10, the terminal end of the clamp arm 522 is spaced apart from the vertical guide post 156, 256, 356 so as to not physically contact the vertical guide post 156, 256, 356. The overall dimensions of the clamp arms 522, 523 are designed such that the terminal ends of the first clamp arm 522 and the second clamp arm 523 do not push, contact or reside against the vertical guide post 156, 256, 356 when the vertical guide post 156, 256, 356 is disposed in the opening 524 and the piezoelectric element 526 is not activated. The clamp arms 522, 523 are connected to the base portion 521 via flex points 527a, 527b. The clamp arms 522, 523 are capable of bending/pivoting at the flex points 527a, 527b without breaking off from the base portion 521. The flex points 527a, 527b may be designed such that when no force is applied to the clamp arms 522, 523, they remain in the state shown in FIG. 10, e.g., not touching or pushing against vertical guide post 156, 256, 356. The flex points 527a, 527b can therefore be considered to be biased towards the state shown in FIG. 10.

FIG. 11 illustrates how the clamp arms 522, 523 move when piezoelectric element 526 is activated and expands. More specifically, when the piezoelectric element 526 expands, it pushes against the base portion 521 at the ends of the recess 525. This outward movement of the base portion 521 causes the arms 522, 523 to effectively pivot inwardly at the flex points 527a, 527b, such that the terminal ends of the arms 522, 523 come closer together and push against the vertical guide post 156, 256, 356, as shown in the inset of FIG. 11. So long as the piezoelectric element 526 is activated, the arms 522, 523 remain pivoted inwardly and continue to exert clamping force on the vertical guide post 156, 256, 356. When the brake assembly 158 is stationary, this clamping force allows the brake assembly 158 to maintain an associated bracket 248, 348, 448 at a desired z position along a respective vertical guide post 156, 256, 356. When the piezoelectric element 526 is deactivated, causing it to reduce in size and no longer push outwardly on the base portion 521, the bias of the flex points 527a, 527b results in the arms reverting back to the position shown in FIG. 10, thereby removing the clamping force from the vertical guide post 156, 256, 356. Thus, the brake assembly 158, which is fixed to bracket 248, 348, 448 is free to move up and down the vertical guide post 156, 256, 356 as the elevator 140 moves an actuator arm assembly 122 that is physically engaged with the bracket 248, 348, 448.

While FIGS. 10 and 11 illustrate an embodiment where the brake assembly 158 includes flex points 527a, 527b for purposes of allowing the terminal ends of the clamp arms 522, 523 to move together and exert a clamping force against the vertical guide post 156, 256, 356, it should be appreciated that other mechanisms for clamp arm movement to exert clamping force can also be used, such as springs, for example. In such an embodiment, the arms may move towards and away from the base portion, parallel to each other, without pivoting. In an embodiment where springs are used, the set of clamp arms may be designed and dimensioned such that the clamp arms exert a clamping force against the vertical guide post when the piezoelectric element is deactivated. When the piezoelectric element is activated, it expands in a similar fashion to the expansion described above with respect to FIG. 11. However, in this embodiment, the expansion of the piezoelectric element pushes the clamp arms away from the base portion. As the clamp arms are pushed away from the base portion, the terminal ends of the clamp arms disengage from the vertical guide post and thereby remove the clamping force from the vertical guide post. When the piezoelectric element is deactivated such that it reduces in size, the arms are pulled back towards the base portion via the springs. The springs recoil sufficiently to bring the clamp arms back towards the base portion and reapply clamping force to the vertical guide post.

FIGS. 10 and 11 generally illustrate an embodiment of the pair of clamp arms in which one piezoelectric element per pair of clamp arms is used. However, it should be appreciated that more than one piezoelectric element per pair of clamp arms can also be used in order to increase the range and type of clamp possible. Furthermore, when multiple piezoelectric arms are incorporated into a pair of clamp arms, the multiple piezoelectric elements may be identical in terms of their rate and type of expansion, or may be different types of piezoelectric elements such that each piezoelectric element provides a different type or degree of movement. Similarly, while FIGS. 10 and 11 generally show pairs of clamp arms that include two arms per pair of clamp arm and wherein each clamp arm is essentially an identical mirror of the opposing arm, it should be appreciated that each pair of clamp arms may include more or fewer than two arms, and that all arms need not be identical.

Figure 12:
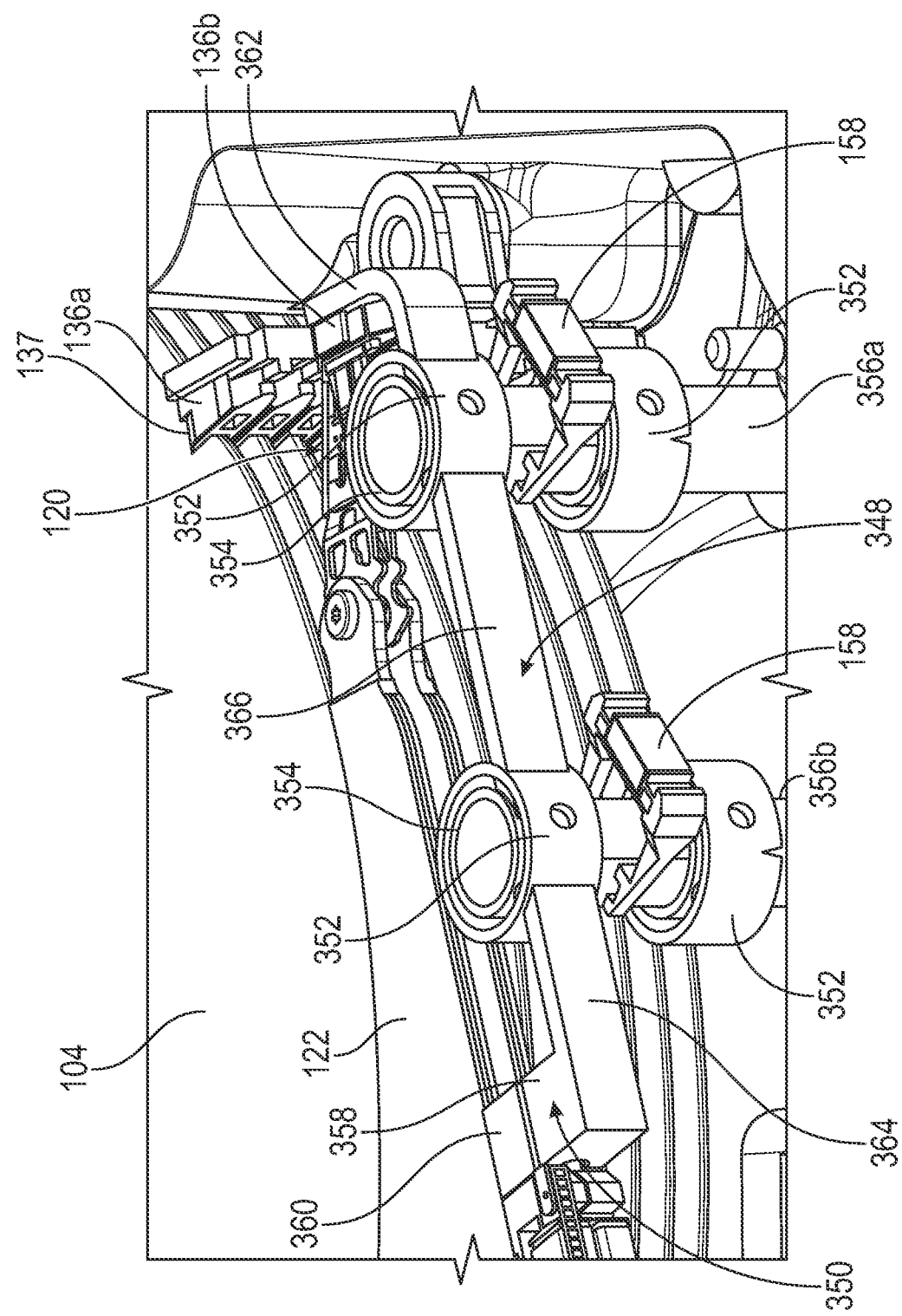
FIG. 12 is a partial perspective view of a data storage device including a third exemplary embodiment of a ramp activation system.
Figure 13:
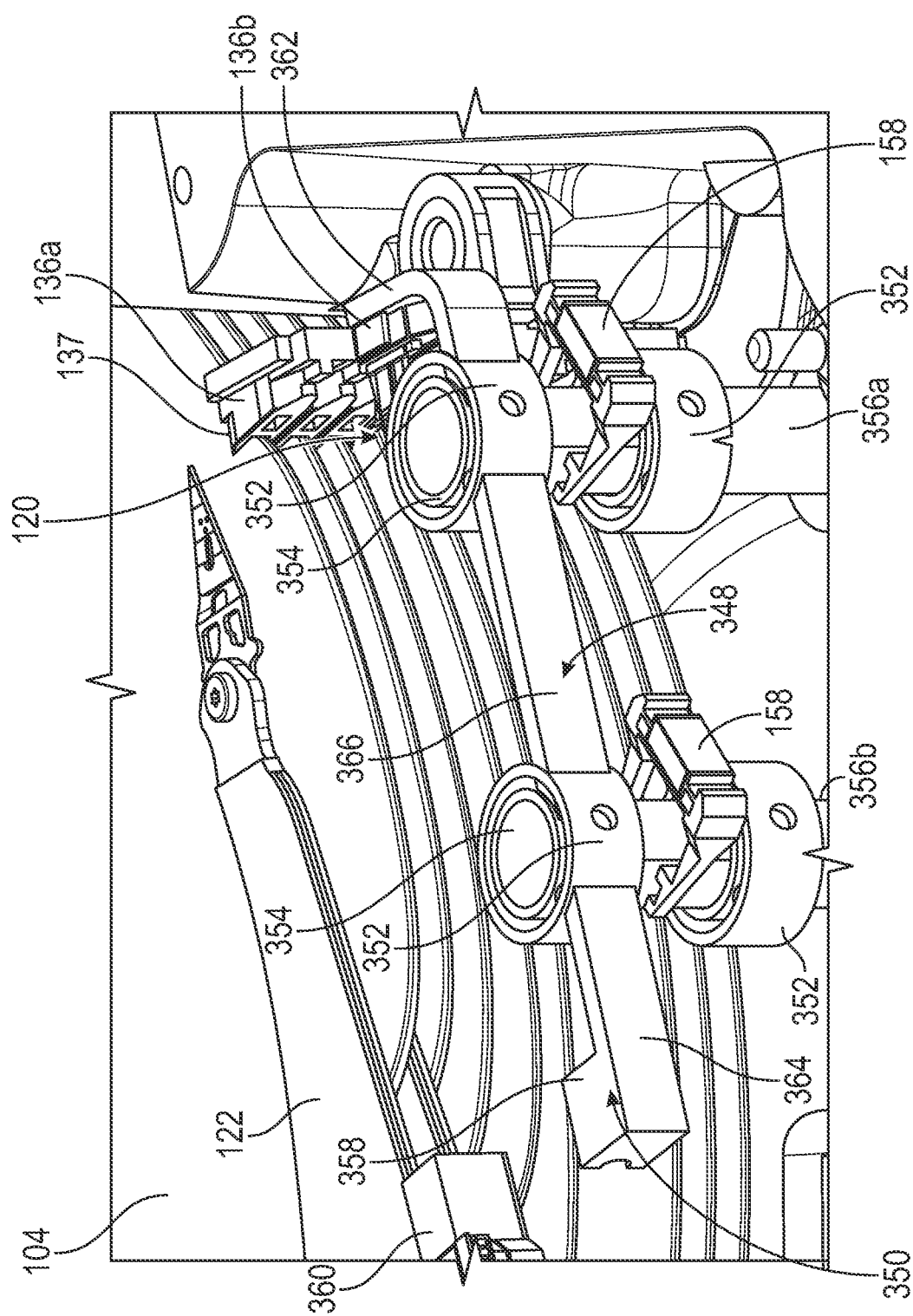
FIG. 13 is similar to FIG. 12 but shows the actuator arm in a read/write position.

FIGS. 12 and 13 illustrate a third exemplary embodiment of a ramp activation system for data storage device 100A, 100B. The moveable ramp 136b is attached to a bracket 348. End portion 350 of bracket 348 includes a ferrous metal portion 358 that is configured to be selectively attracted to an electromagnetic portion 360 fixed to actuator arm assembly 122. To physically engage moveable ramp 136b to actuator arm assembly 122 with bracket 348, the electromagnetic portion 360 is energized by electrical current to facilitate its attraction to portion 358 of end portion 350, as shown in FIG. 12. Portion 358 is suitably formed of a ferrous metal or another material that is attracted to a magnet. When the current is turned off, the ferrous metal and electromagnetic portions 358, 360 do not attract each other and actuator arm assembly 122 is free to move independently of bracket 348, as shown in FIG. 13. In an embodiment, portion 358 is a magnet or an electromagnet. To disengage the portions 358, 360, the polarity of one of the electromagnets can be reversed to separate the portions 358, 360, thereby separating the bracket 348 and moveable ramp 136b from the actuator arm assembly 122. In the illustrated embodiment, two vertical guide posts 356a and 356b are used to provide additional structural support for bracket 348. In the illustrated embodiment, an intermediate portion 366 of the bracket 348 is disposed between the portion 362 near moveable ramp 136b and portion 364 near end portion 350.

In an exemplary embodiment, moveable ramp 136b having bracket 348 includes linear (vertical) cylindrical sliders 352 mounted with cylindrical bearings 354 on each of vertical guide posts 356a, 356b. In the illustrated engaged configuration between actuator arm assembly 122 and moveable ramp 136b shown in FIG. 12, as elevator 140 is activated to raise and lower actuator arm assembly 122, the moveable ramp 136b, which is connected to actuator arm assembly 122 by bracket 348, moves with the actuator arm assembly 122 up and down along vertical guide posts 356a, 356b. Thus, unified motion of the actuator arm assembly 122 with the head components 102 thereon, as well as the moveable ramp 136b on which the head end 142 rests, is accomplished even though there is no direct connection between the elevator 140 and the moveable ramp 136b.

For use of heads 102 for reading and writing data relative to disk 104, linear actuator 220 is activated to slide the actuator arm assembly 122 on rail 230, to thereby move the head end 142 off of the head support ramp assembly 136 and to the disk 104, as shown in FIG. 13. With bracket 348 thus disengaged from actuator arm assembly 122, brake assembly 158 is used to maintain moveable ramp 136b in the location last achieved.

FIGS. 14-15D illustrate a fourth exemplary embodiment of a ramp activation system for data storage device 100A, 100B. Moveable ramp 136b includes a rotatable portion 436 that pivots about axis 458 to move out of the way of the outer diameter 109 of disk 104. Accordingly, in this fourth embodiment, no stationary ramp is used. A rotary actuator 460 (shown schematically) is used to rotate the moveable ramp 436 about the axis 458. Such an actuator 460 can be of various types, including shape memory alloy (SMA), motor, solenoid, and bi-metallic types. Axis 458 is substantially parallel to spindle 105 defining the rotation axis of the disk 104 in direction 107.

The rotary ramp system can also use a pancake motor to move the moveable ramp 436 in the z direction as well as to rotate it about the axis 458. The change in operation between linear z direction motion and rotary motion can be achieved using a clutch system, brake system, or physical stops (not shown). Feedback for alignment can be achieved optically or using other sensor technology.

Upper load beam portion 120a and lower load beam portion 120b carry heads 102 for reading and writing on top and bottom surfaces of a disk 104. A lift tab 446 extends from the load beam 120 to rest on the rotatable portion 436 of movable ramp 136b when the disk drive storage device is in an off or non-operating state. Bracket 448 is attached to moveable ramp 136b and is configured for selective engagement to, and disengagement from, actuator arm assembly 122. In an exemplary embodiment, engagement of moveable ramp 136b to actuator arm assembly 122 is accomplished by insertion of end portion 450 of bracket 448 into channel 148 of actuator arm assembly 122, as shown in FIG. 14. In an exemplary embodiment, disengagement of actuator arm assembly 122 from moveable ramp 136b is accomplished by sliding actuator arm on rail 230 so that its channel 148 is free from end portion 450 of bracket 448, as shown in FIGS. 15C and 15D. In an exemplary embodiment, moveable ramp 136b includes a linear slider 152 mounted with a linear bearing 154 on vertical guide post 156.

Figure 15A:
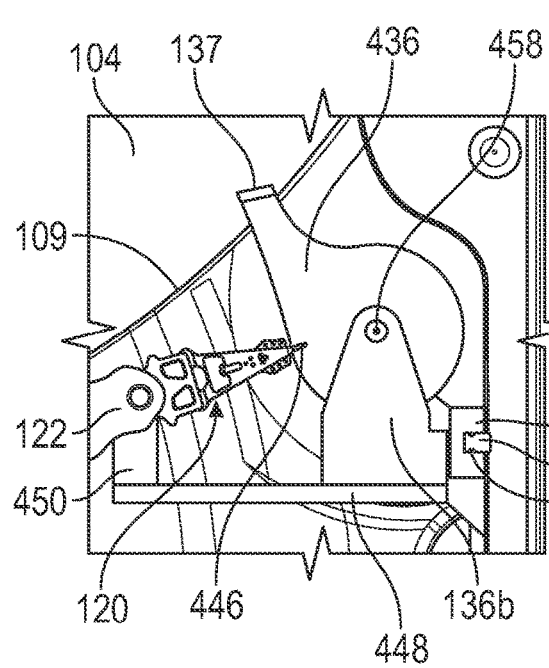
FIG. 15A is a top plan view of a portion of the data storage device of FIG. 14.
Figure 15B:
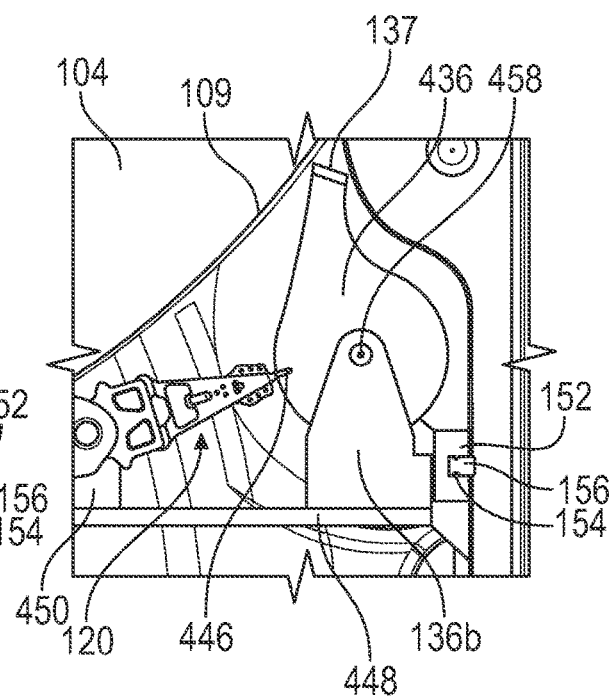
FIG. 15B is a top plan view of a portion of the data storage device of FIG. 14, with the movable ramp portion pivoted about its axis compared to the configuration of FIG. 15A.
Figure 15C:
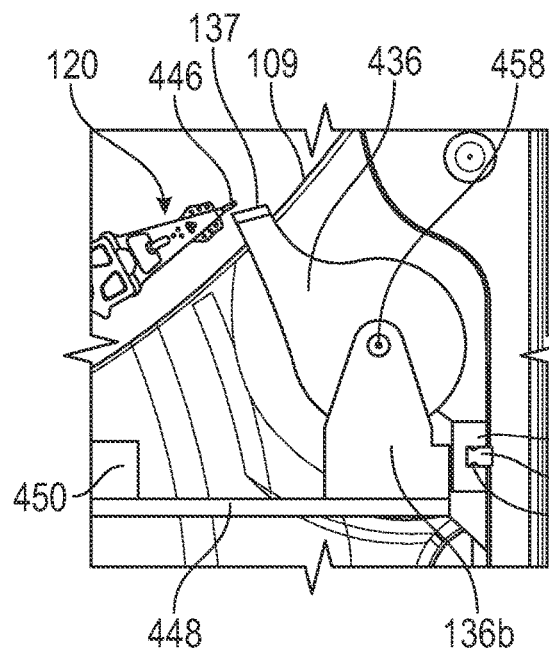
FIG. 15C is a top plan view of a portion of the data storage device of FIG. 14, with the actuator arm in a read/write position.
Figure 15D:
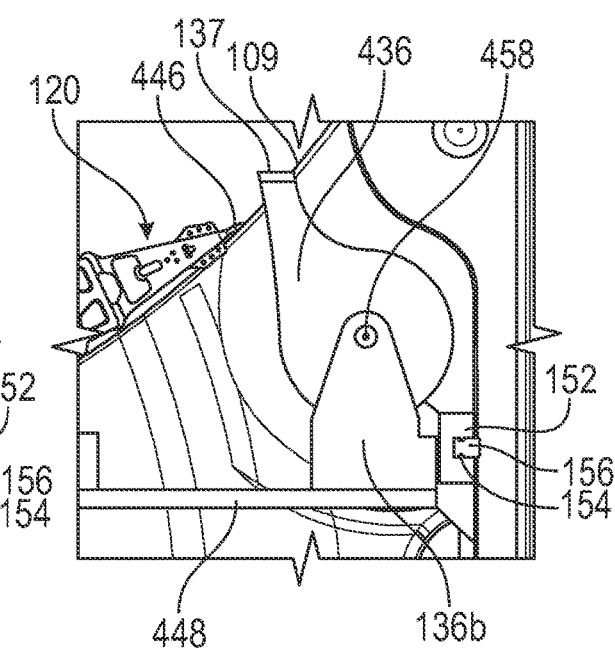
FIG. 15D is a top plan view of a portion of the data storage device of FIG. 14, with the movable ramp portion pivoted about its axis to allow the actuator arm to assume a read/write position at an extreme outer diameter of the disk.

In the illustrated engaged configuration between actuator arm assembly 122 and moveable ramp 136b shown in FIGS. 14, 15A and 15B, as elevator 140 is activated to raise and lower actuator arm assembly 122, the moveable ramp 136b, which is connected to actuator arm assembly 122 by bracket 448, moves with the actuator arm assembly 122 up and down along vertical guide post 156. Thus, unified motion of the actuator arm assembly 122 with the head components 102 thereon, as well as the moveable ramp 136b on which the head end 142 rests, is accomplished even though there is no direct connection between the elevator 140 and the moveable ramp 136b.

For use of heads 102 for reading and writing data relative to disk 104, linear actuator 220 is activated to slide actuator arm assembly 122 on rail 230, to thereby move the head end 142 off of the rotatable portion 436 and to the disk 104, as shown in FIGS. 15C and 15D. With bracket 448 thus disengaged from channel 148 of actuator arm assembly 122, brake assembly 158 (shown schematically) is used to maintain moveable ramp 136b in the location last achieved. In the illustrated embodiment, end portion 450 of bracket 448 is located on one side of moveable ramp 136b, and vertical guide post 156 is located on an opposite side of moveable ramp 136b.

FIG. 15A shows lift tab 446 resting on the rotatable portion 436 of movable ramp 136b. By sliding actuator arm assembly 122 on rail 230, the transducer head 102 can be moved in a radial cross-track direction so that the load beam 120 slides off the rotatable portion 436 of the moveable ramp 136b, past edge 137, and to disks 104, as shown in FIG. 15C. As shown in FIG. 15D, to enable access of the head 102 (on lift tab 446) to an extreme outer diameter track close to OD 109, the rotatable portion 436 is moved by the rotary actuator 460 in a clockwise motion to thereby allow additional clearance of head 102 very close to OD 109.

During normal use/operation of data storage device, the first ramp portion 136a, 436 is positioned with its edge 137 over the OD 109. This enables head end 142 of actuator arm assembly 122 to move in radial direction 218 (as actuator arm assembly 122 slides on rail 230) to move between a read/write position at disk 104 and a parked position on head support ramp assembly 136. However, when first ramp portion 136a, 436 is positioned with its edge over the OD 109, one or more of disks 104 cannot be easily replaced. Thus, as shown in FIG. 15B, to enable replacement of one or more disks 104, first ramp portion 436 may be rotated about pivot axis 458 to clear the edge ramp 137 from the OD 109. It should be noted that if the actuator arm assembly 122 or any portion thereof is over/under disk 104, the actuator arm assembly 122 is also moved along rail 230 until head end 142 is supported on the ramp portion 136b, 436.

With head end 142 of the HSA 138 supported on the ramp portion 436, and with the ramp portion 436 in the rotated position shown in FIG. 15B, one or more disks 104 may be easily lifted from the spindle 105 and replaced. Such an embodiment enables the replacement and addition of one or more disks 104 without disassembling the HSA 138. Another position in which the ramp portion 436 is off disks 104 can be accomplished by rotating ramp portion 436 even farther counter-clockwise to pass edge 137 over the disk and off again to the left. This is useful when using a hard stop method and the actuation system is used for rotation, especially when it is a motor. Since there is a hard stop on both sides, the rotatable ramp portion 436 can be rotated using the actuator/motor and still have it move up and down as in a screw system.

Although the above disclosure regarding FIGS. 14-15D primarily describes a head-support actuator as rotary actuator 460, linear actuators may instead be used in some embodiments. In some embodiments, a split ramp (having a separate first portion 136a and second portion 136b, 436) may be employed in "jukebox" data storage device where a portion of the split ramp may be retracted/rotated to mount any of a plurality of selectable disks onto the spindle. After the disk is suitably mounted, the split ramp can be moved back to its non-retracted/non-rotated original position to ready the device for read/write operations.

FIGS. 16-19 are perspective views of another embodiment of an elevator system for a linear actuator assembly 220 for any of the described data storage devices 100A, 100B. Because the elevator 140C is does not move linearly with the actuator arm assembly 122, there is less load on the linear driver or motor 451 than in the elevator system of FIGS. 2A-2C. Moreover, there is less concern about weight of the elevator 140C, so it can be relatively robust. Additionally, in the case where the ramp 136 has a movable ramp portion 136b, 436 the elevator 140C can be operationally connected to move both the actuator arm assembly 122 and the movable ramp portion 136b, 436 in unison.

Figure 16:
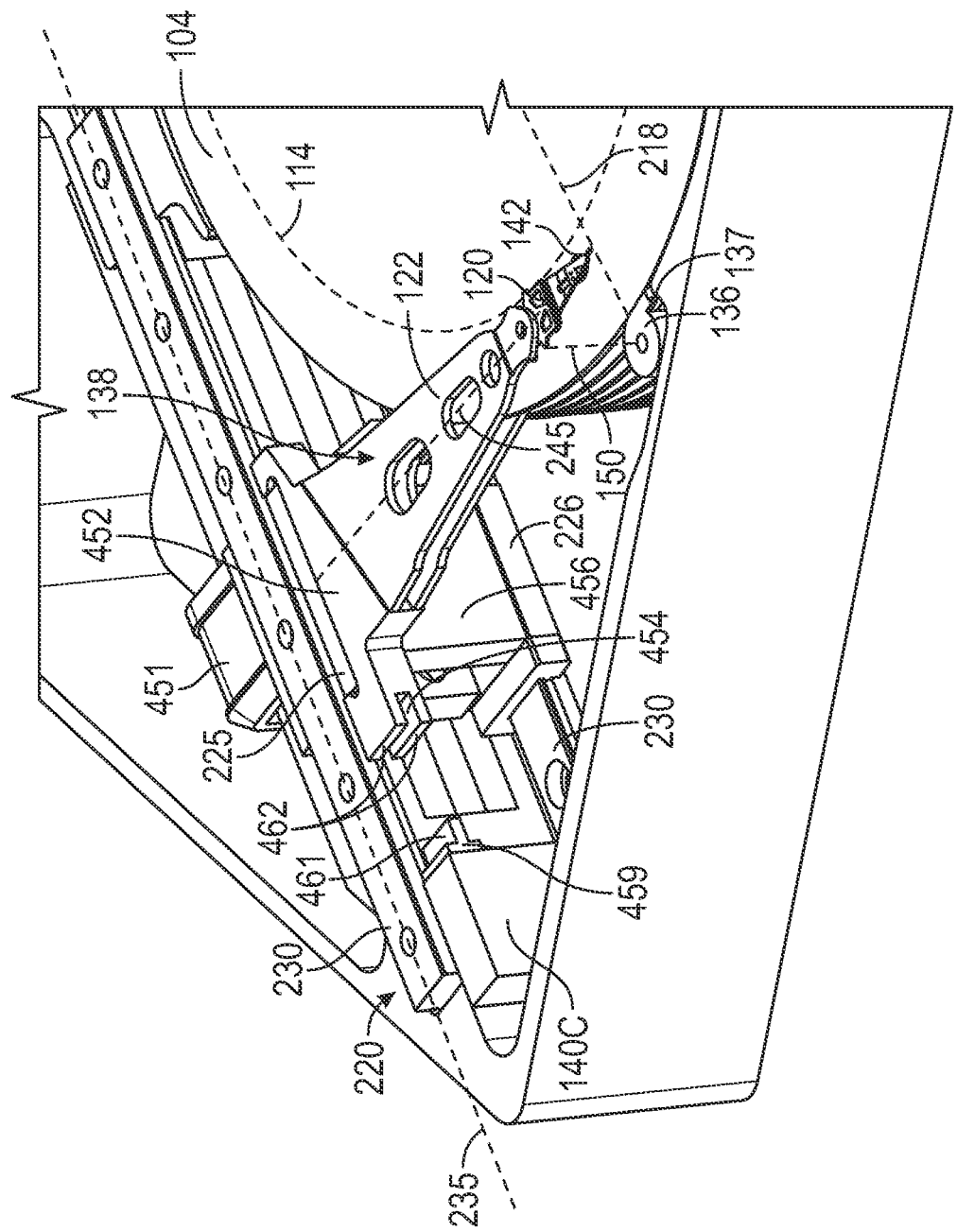
FIG. 16 is a perspective view of a data storage device with an elevator that is selectively attachable to the actuator arm, wherein the actuator arm is in a raised position over the disk.
Figure 17:
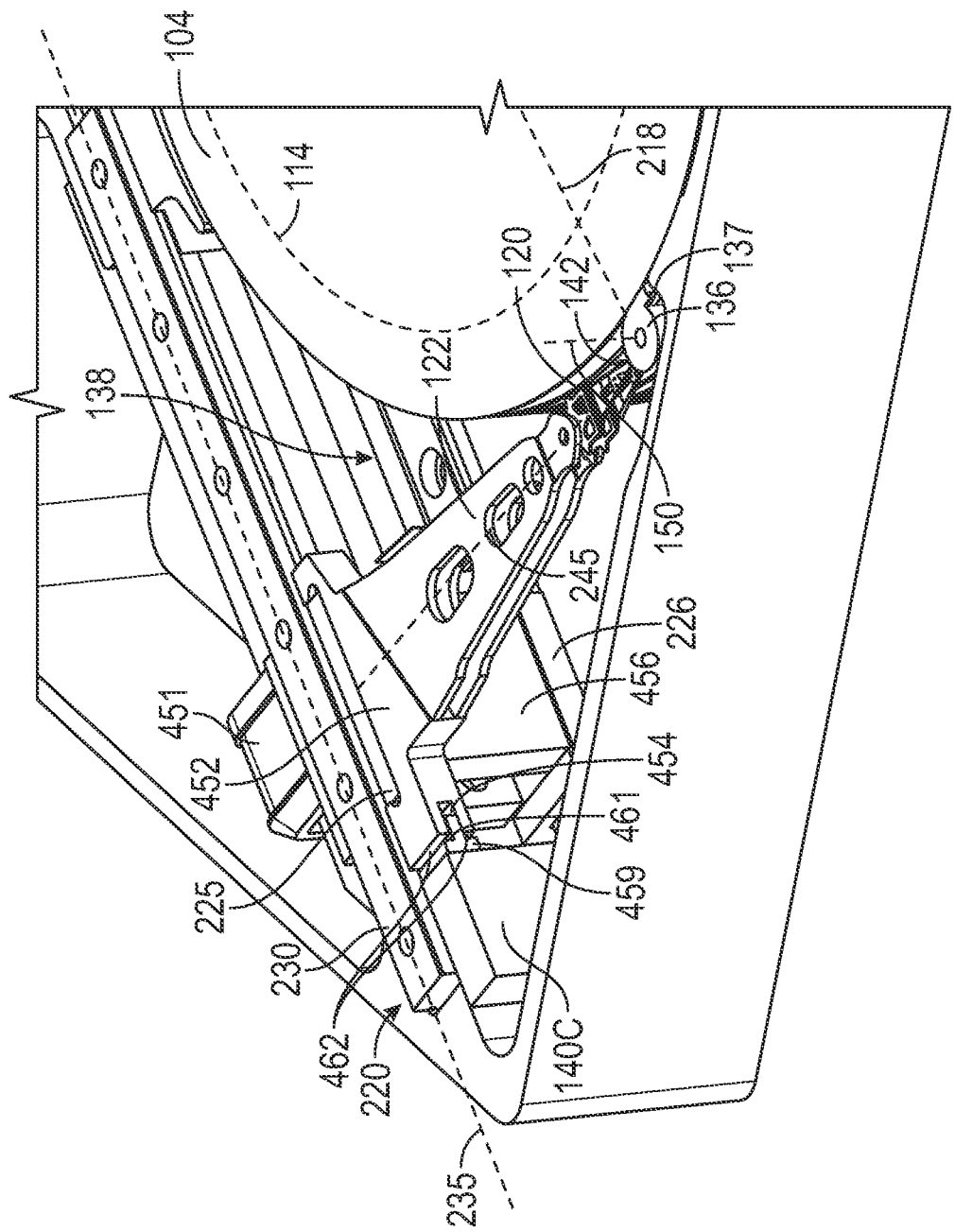
FIG. 17 is a perspective view of the data storage device of FIG. 16, wherein the actuator arm is in a raised position off the disk.

FIG. 16 shows the actuator arm assembly 122 is in a raised position, and wherein it has slid linearly along rails 230 to a position that places head end 142 of HSA 138 over the disk 104. FIG. 17 shows the actuator arm assembly 122 in a raised position, wherein the head end 142 of HSA 138 is off the disk 104 and rests on ramp 136. A vertical guide 456 extends between the top sliding bracket 225 and the bottom sliding bracket 226 of linear actuator assembly 220. Coupler bracket 452 connects actuator arm assembly 122 to the vertical guide 456 in a manner that allows the coupler bracket 452, and in turn the actuator arm assembly 122, to move up and down the vertical guide 456 in the z direction. Coupler bracket 452 is selectively engageable with elevator 104C. In the illustrated embodiment, coupler bracket 452 includes a cleft or recess 454 between flanges 462. Elevator bracket 459, which moves up and down by motive of elevator 140C, has a complementary projection 461. As shown in FIG. 7, coupler bracket 452 engages with elevator bracket 459 by insertion of projection 461 into recess 454. While a particular bracket configuration is illustrated and described, it is contemplated that other coupling mechanisms such as clamps can also be used. The selective coupling and uncoupling of elevator 140C and arm 122 is also referred to as "clamping," though no forceful frictional engagement may be involved.

Figure 18:
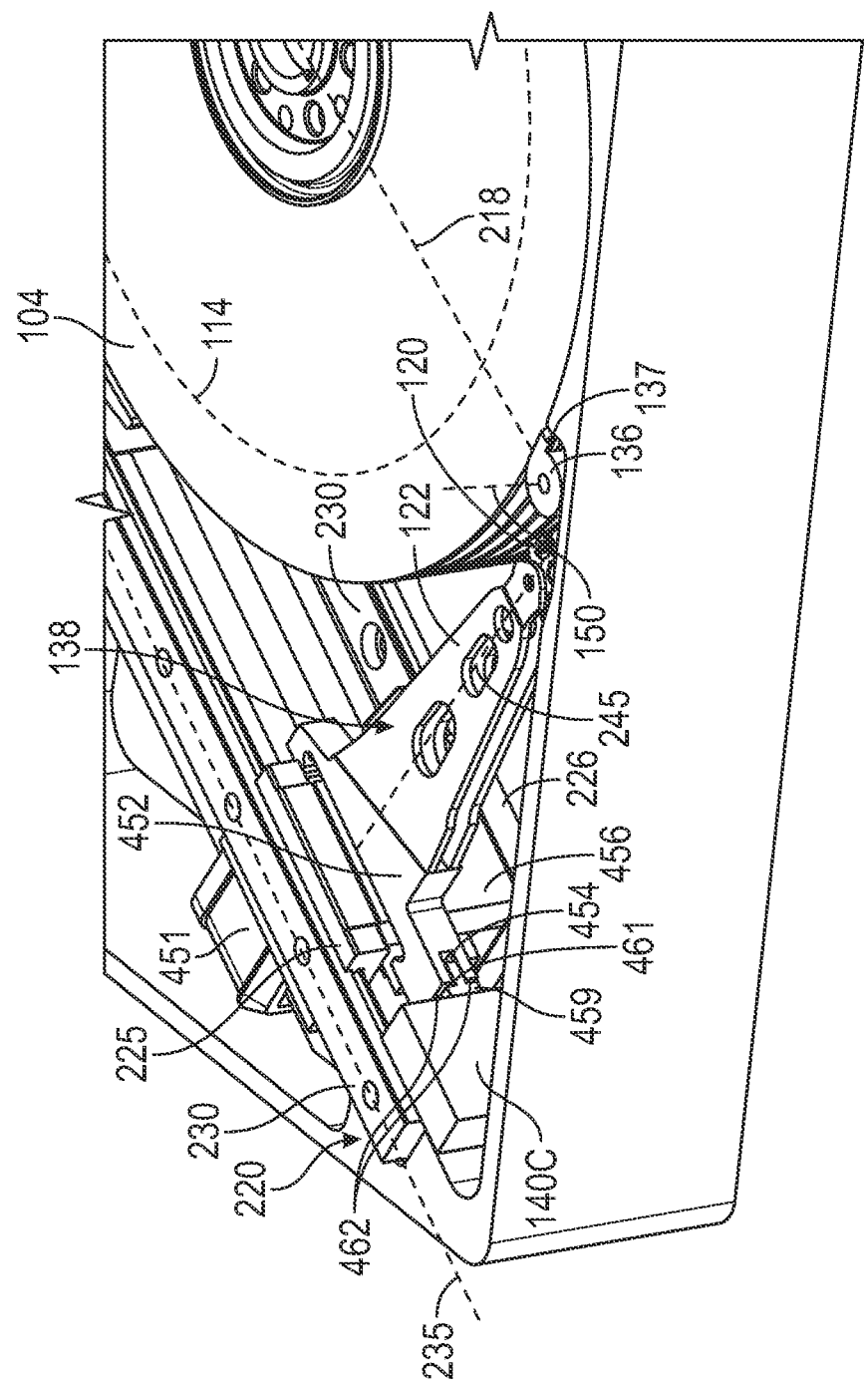
FIG. 18 is a perspective view of the data storage device of FIG. 16, wherein the actuator arm is in a lowered position off the disk.
Figure 19:
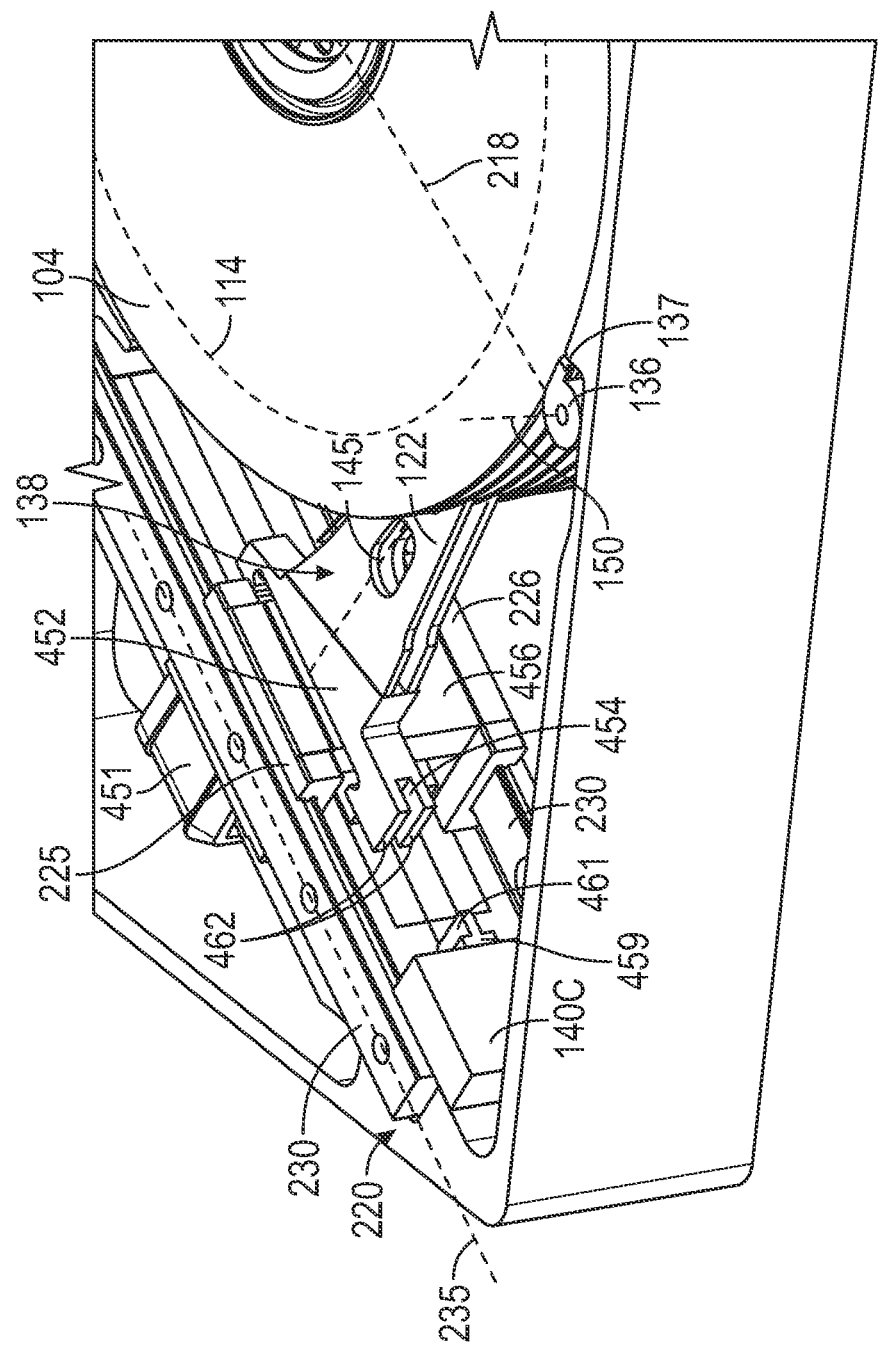
FIG. 19 is a perspective view of the data storage device of FIG. 16, wherein the actuator arm is in a lowered position on the disk.

As shown in FIG. 18, with the brackets 452, 459 thus physically connected, activation of elevator 104C to lower or raise elevator bracket 459 also lowers or raises the coupled bracket 452 and the attached actuator arm assembly 122. Thus, the head end 142 of HSA 138 can be moved up and down in the z direction to access different disks 104 in the disk stack using an elevator 140C that is only connected to the actuator arm assembly 122 when needed to affect the vertical motion of the arm 122. When the actuator arm assembly 122 has reached the desired vertical position, any type of braking mechanism (such as the described brake assembly 158, for example) can be used to hold the coupler bracket 452 in the desired vertical position on vertical guide 456. Then, the linear motor 451 is activated, as shown in FIG. 9, to move the brackets 225, 226 and vertical guide 456 along rails 230. This x-y motion thereby disengages the recess 454 from projection 461 and allows the actuator arm assembly 122 to slide between lower disks in the stack to position the head end 142 to read/write a desired track. While particular coupling mechanisms are described for selectively engaging and disengaging actuator arm assembly 122 to and from elevator 140C, it is to be understood that other mechanical, magnetic, electromagnetic, and other forms of physical connection and disconnection can be used.

Figure 21:
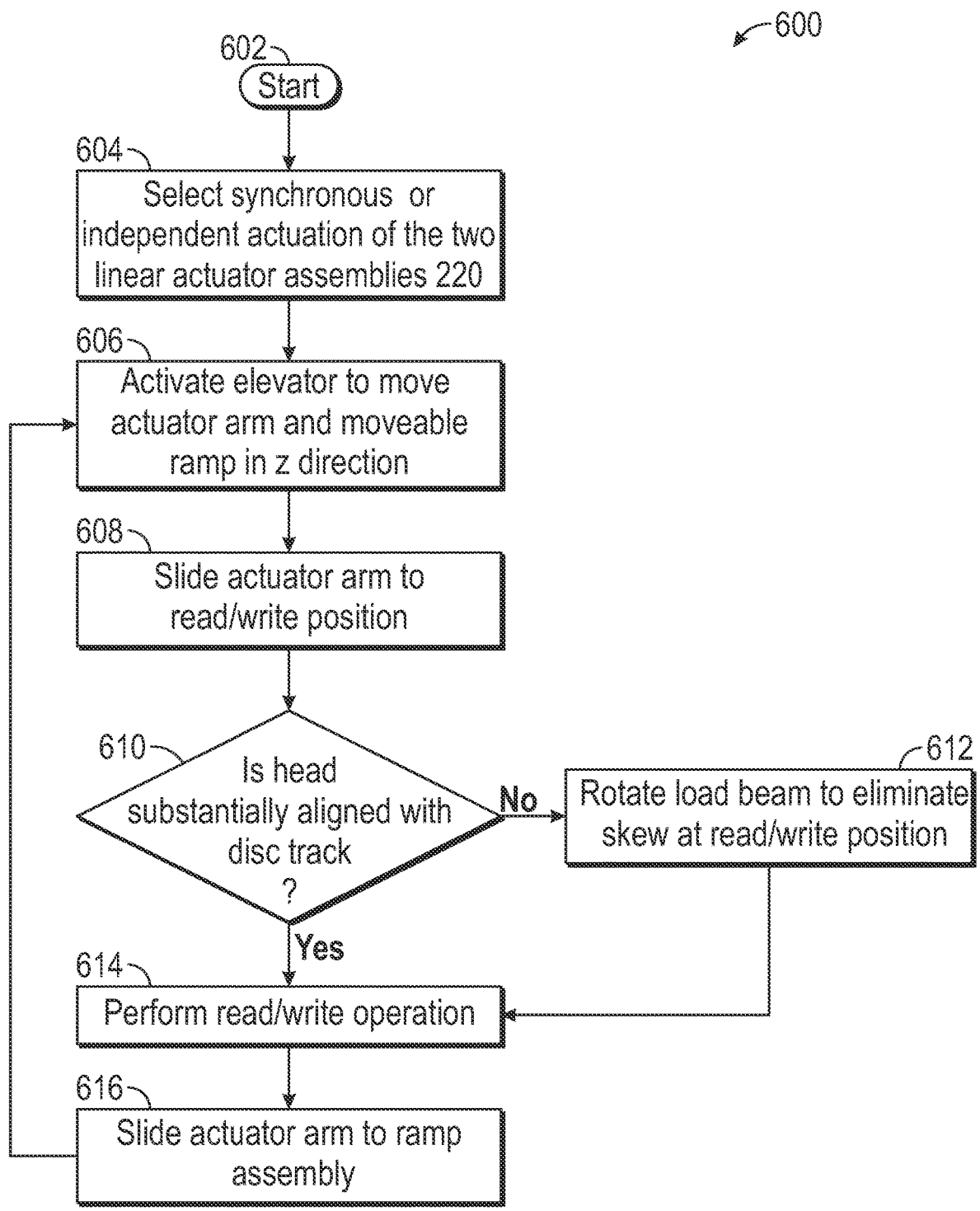
FIG. 21 is a flowchart of an exemplary method for using the described systems.

In many respects, systems 100A and 100B are similar to each other, and descriptions of to one system or method also apply to the other systems and methods where relevant. FIG. 21 is a simplified flow diagram of a method 600 of using a zero skew disk drive system with dual actuators in accordance with exemplary embodiments. The method may be carried out in devices of the type described above in connection with FIGS. 1-20. The method starts at 602 and proceeds to 604, which includes selecting whether to control the dual linear actuator assemblies 220 synchronously or independently. The selection at this step determines whether the head circuitry 132, drive circuitry 112, elevator 140, and other components will be utilized in a synchronized or asynchronous manner. In either case, the method moves to 606, which includes, for each HSA 148, activating the elevator 140 to move actuator arm assembly 122 to in a z direction to a desired location relative to the disk stack.

The method continues to 608, at which the actuator arm assembly 122 is slid along rails 230 in a straight line in the x-y plane to place the head 102 in a desired read/write position relative to a disk surface. At 610, a query asks whether head 102 is substantially aligned with a data track 114 of the disk 104. If yes, as in the embodiments of FIGS. 1A and 1B, then the method proceeds to 614. If not, as may be the case in the embodiments of FIGS. 3A and 3B, the method continues to 312, at which the load beam is rotated about a pivot axis 128 to eliminate skew between the head 102 and the track 114, thereby placing the head 102 in a desired read/write position relative to a disk surface.

Then at 614, a read/write operation is performed by head 102 of load beam 120 on disk 104. At 616, after the read/write operation is complete, actuator arm assembly 122 is slid along rails 230 to move the load beam 120 off the disk 104 and to a parked position on ramp assembly 136. To read/write relative to another disk 104, the method can return to 606, wherein the load beam 120 is positioned to rest on ramp assembly 136 so that the elevator can move the arm 122 and the moveable ramp portion 136b in unison.

The illustrations of the embodiments described herein are intended to provide a general understanding of the structure of the various embodiments. The illustrations are not intended to serve as a complete description of all of the elements and features of apparatus and systems that utilize the structures or methods described herein. Features described with respect to any embodiment also apply to any other embodiment. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description. All patent documents mentioned in the description are incorporated by reference.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. For example, features described with respect to one embodiment may be incorporated into other embodiments. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
    a stack comprising a plurality of data storage disks, each of the plurality of data storage disks comprising a read/write surface;
    a first arm having a first head end that is movable relative to the stack;
    a first head supported by the first head end of the first arm, wherein the first head is configured to interact with a selected one of the read/write surfaces;
    a first linear driver configured to move the first arm along a first straight line in a x-y plane defined by the one of the read/write surfaces;
    a first elevator configured to move the first arm in a z direction;
    a second arm having a second head end that is movable relative to the stack;
    a second head supported by the second head end of the second arm; and
    a second linear driver configured to move the second arm along a second straight line in the x-y plane.

2. The data storage device of claim 1, comprising a second elevator configured to move the second arm in the z direction.

3. The data storage device of claim 2, in which the first elevator and the second elevator operate independently of each other.

4. The data storage device of claim 1, in which the first straight line is parallel to the second straight line.

5. The data storage device of claim 1, in which the first head end of the first arm moves along a first radius of one of the plurality of data storage disks.

6. The data storage device of claim 5, in which the second head end of the first arm moves along a second radius of the one of the plurality of data storage disks, wherein the first radius and the second radius constitute a diameter of the disk.

7. The data storage device of claim 1, comprising:
    a first ramp configured to support the first head end of the first arm; and
    a second ramp configured to support the second head end of the second arm.

8. The data storage device of claim 7, in which the first ramp and the second ramp are positioned on diametrically opposed sides of the stack.

9. The data storage device of claim 7, in which the first ramp and the second ramp are positioned on a common side of the stack.

10. The data storage device of claim 1, in which the first arm has a first longitudinal axis that is perpendicular to the first straight line.

11. The data storage device of claim 1, in which the first arm has a first longitudinal axis that is inclined relative to the first straight line at an angle between about 20 degrees and about 80 degrees.

12. The data storage device of claim 11, in which the first load beam has a selectively pivotable attachment to the first arm, and in which the first load beam is aligned with a data track of the one of the read/write surfaces.

13. The data storage device of claim 1, in which the first linear driver and the second linear driver operate independently of each other.

14. A data storage device comprising:
    a data storage disk having a read/write surface defining an x-y plane;
    a first arm having a first head end that is movable relative to the data storage disk;
    a first head supported by the first head end of the first arm, wherein the first head is configured to interact with the read/write surface;
    a first ramp configured to support the first head proximate an outer diameter of the data storage disk;

a first linear driver configured to move the first arm along a first straight line in the x-y plane between the first ramp and an inner diameter of the data storage disk;

a second arm having a second head end that is movable relative to the data storage disk;

a second head supported by the second head end of the second arm, wherein the second head is configured to interact with the read/write surface;

a second ramp configured to support the second head proximate the outer diameter of the data storage disk; and a second linear driver configured to move the second arm along a second straight line in the x-y plane between the second ramp and the inner diameter of the data storage disk, the second straight line being parallel to the first straight line.

15. The data storage device of claim 14, in which the first linear driver and the second linear driver operate independently of each other.

16. The data storage device of claim 14, comprising:

a first elevator configured to move the first arm in a z direction; and a second elevator configured to move the second arm in the z direction;

in which the first elevator and the second elevator operate independently of each other.

17. A method comprising:

supporting a first head with a first arm, wherein the first head is configured to interact with a first read/write surface of a data storage disk defining an x-y plane;

linearly moving the first arm relative to the data storage disk along a first straight line in the x-y plane;

moving the first arm perpendicularly to the x-y plane in a z direction;

supporting a second head with a second arm;

linearly moving the second arm relative to the data storage disk along a second straight line in the x-y plane, the second straight line being parallel to the first straight line; and moving the second arm perpendicularly to the x-y plane in the z direction.

18. The method of claim 17 comprising moving the first arm independently from moving the second arm.

19. The method of claim 17, wherein:

the first head interacts with the first read/write surface; and the second head interacts with a second read/write surface that is different from the first read/write surface.

20. The method of claim 17, wherein the data storage disk is one of a plurality of data storage disks stacked upon a spindle, wherein:

the first head interacts with the a first disk of the plurality of data storage disks; and the second head interacts with a second disk of the plurality of data storage disks that is different from the first disk.

* * * * *